United States Patent
Ido et al.

(10) Patent No.: US 9,750,095 B2
(45) Date of Patent: Aug. 29, 2017

(54) LIGHT MODULATION CONTROLLER, LIGHTING SYSTEM, AND EQUIPMENT INSTRUMENT

(71) Applicant: Panasonic Intellectual Property Management Co., Ltd., Osaka (JP)

(72) Inventors: Shigeru Ido, Osaka (JP); Akinori Hiramatu, Nara (JP); Hiroshi Kido, Osaka (JP); Takeshi Kamoi, Kyoto (JP); Daisuke Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/202,794

(22) Filed: Jul. 6, 2016

(65) Prior Publication Data

US 2017/0013686 A1  Jan. 12, 2017

(30) Foreign Application Priority Data

Jul. 8, 2015  (JP) .................................. 2015-137196

(51) Int. Cl.
*H05B 37/02* (2006.01)
*H05B 33/08* (2006.01)

(52) U.S. Cl.
CPC ..... *H05B 33/0815* (2013.01); *H05B 33/0842* (2013.01)

(58) Field of Classification Search
CPC ............ H05B 33/0815; H05B 33/0851; H05B 33/0845
See application file for complete search history.

(56) References Cited

U.S. PATENT DOCUMENTS

| | | | |
|---|---|---|---|
| 2007/0222739 A1* | 9/2007 | Yu .......................... | G09G 3/3406 345/102 |
| 2008/0191641 A1* | 8/2008 | Egawa ................. | G09G 3/3413 315/294 |
| 2010/0097009 A1* | 4/2010 | Lin ..................... | H05B 33/0854 315/297 |
| 2010/0231141 A1* | 9/2010 | van Beckhoven . | H05B 33/0818 315/307 |
| 2012/0262082 A1 | 10/2012 | Esaki et al. | |
| 2013/0257281 A1* | 10/2013 | Niino ..................... | H05B 37/03 315/122 |
| 2016/0044757 A1* | 2/2016 | Koo ..................... | H05B 33/089 315/297 |
| 2016/0065085 A1* | 3/2016 | Hamamoto ........ | H05B 33/0815 315/200 R |
| 2016/0099773 A1* | 4/2016 | Raj ..................... | H04B 10/116 398/118 |

FOREIGN PATENT DOCUMENTS

JP   2012-226924 A   11/2012

* cited by examiner

*Primary Examiner* — Don Le
(74) *Attorney, Agent, or Firm* — Renner, Otto, Boisselle & Sklar

(57) ABSTRACT

A control circuit is configured to convert a DC voltage that is outputted from a DC power supply to a square wave voltage by switching the switching element according to a PWM signal having a duty ratio that corresponds to a light modulation level of the light source unit, and cause the square wave voltage to be outputted to the light source unit. The control circuit includes a voltage controller configured to control an operating voltage for operating the switching element such that at least one of a rising time and a falling time of a current that flows through the switching element is 1 microsecond or more.

14 Claims, 19 Drawing Sheets

LIGHT MODULATION CONTROLLER, LIGHTING SYSTEM, AND EQUIPMENT INSTRUMENT

CROSS-REFERENCE TO RELATED APPLICATION

This application claims the benefit of priority of Japanese Patent Application Number 2015-1371969, filed on Jul. 8, 2015, the entire contents of which are hereby incorporated by reference.

TECHNICAL FIELD

This disclosure relates to light modulation controllers, lighting systems, and equipment instruments, and specifically relates to a light modulation controller for performing light modulation control for light emission on a semiconductor light-emitting element, a lighting system, and an equipment instrument.

BACKGROUND ART

Heretofore, lighting devices for performing light modulation control for light emission on a semiconductor light-emitting element have been provided (refer to Document 1: JP 2012-226924 A). A lighting device described in Document 1 includes a step-up chopper circuit and a step-down chopper circuit. The step-up chopper circuit is configured to rectify and smooth an AC power supply voltage, and output a constant DC voltage. The step-down chopper circuit is configured to step down an output of the step-up chopper circuit and supply the stepped down voltage to a semiconductor light-emitting element.

In the lighting device described in Document 1, light modulation control for light emission is performed on the semiconductor light-emitting element by the light modulation control circuit controlling an on-time width of a switching element included in the step-down chopper circuit.

Also, a lighting device is provided that is configured to perform light modulation control for light emission on a semiconductor light-emitting element by intermittently supplying a DC voltage that is outputted from a DC power supply according to a PWM signal. The lighting device includes a switching element that is electrically connected between the DC power supply and the semiconductor light-emitting element. The DC power supply is configured to output a DC voltage having a voltage value corresponding to the semiconductor light-emitting element.

In the lighting device, a square wave voltage according to the PWM signal is supplied to the semiconductor light-emitting element by turning on and off the switching element according to the PWM signal, and as a result, light modulation control for light emission is performed on the semiconductor light-emitting element.

Incidentally, in the latter lighting device described above, a current that is supplied to the semiconductor light-emitting element via the switching element includes harmonic components in addition to a fundamental wave component, and therefore light that is emitted from the semiconductor light-emitting element includes harmonic components as well.

Therefore, in the case where a barcode reader that emits light having the same frequency as a frequency of one of the harmonic components is used under lighting by the semiconductor light-emitting element when a barcode is read, for example, it is possible that the content of the barcode cannot be read due to light that is emitted from the semiconductor light-emitting element.

SUMMARY

The present disclosure has been made in view of the above-described problems, and an object of the present disclosure is to provide a light modulation controller in which generation of harmonic components, due to a switching operation of a switching element, in light that is emitted from a semiconductor light-emitting element is suppressed, a lighting system, and an equipment instrument.

A light modulation controller according to an aspect of the present disclosure includes a switching element and a control circuit. The switching element is electrically connected between a DC power supply and a light source unit. The light source unit includes a semiconductor light-emitting element. The DC power supply is configured to output a DC voltage having a voltage value capable of causing a semiconductor light-emitting element to emit light. The control circuit is configured to control a switching operation of the switching element. The control circuit is configured to convert the DC voltage that is outputted from the DC power supply to a square wave voltage by switching the switching element according to a PWM signal having a duty ratio that corresponds to a light modulation level of the light source unit, and cause the square wave voltage to be outputted to the light source unit. The control circuit includes a voltage controller. The voltage controller is configured to control an operating voltage for operating the switching element such that at least one of a rising time and a falling time of a current that flows through the switching element is 1 microsecond or more.

A lighting system according to an aspect of the present disclosure includes the light source unit and the above-described light modulation controller. The light modulation controller is configured to perform light modulation control on the light source unit.

An equipment instrument according to an aspect of the present disclosure includes the light source unit, the above-described light modulation controller, and an equipment instrument body. The light modulation controller is configured to perform light modulation control on the light source unit. The equipment instrument body holds the light source unit and the light modulation controller.

BRIEF DESCRIPTION OF DRAWINGS

The figures depict one or more implementations in accordance with the present teaching, by way of example only, not by way of limitation. In the figures, like reference numerals refer to the same or similar elements.

DESCRIPTION OF EMBODIMENT

A light modulation controller, a lighting system, and an equipment instrument according to an embodiment will be specifically described with reference to the drawings. Note that the configuration described below is merely an example of the present invention, and the present invention is not limited to the following embodiment. Therefore, in addition to the embodiment, various modifications can be made according to the design or the like, as long as they do not depart from the technical concept of the present invention.

Figure 1:
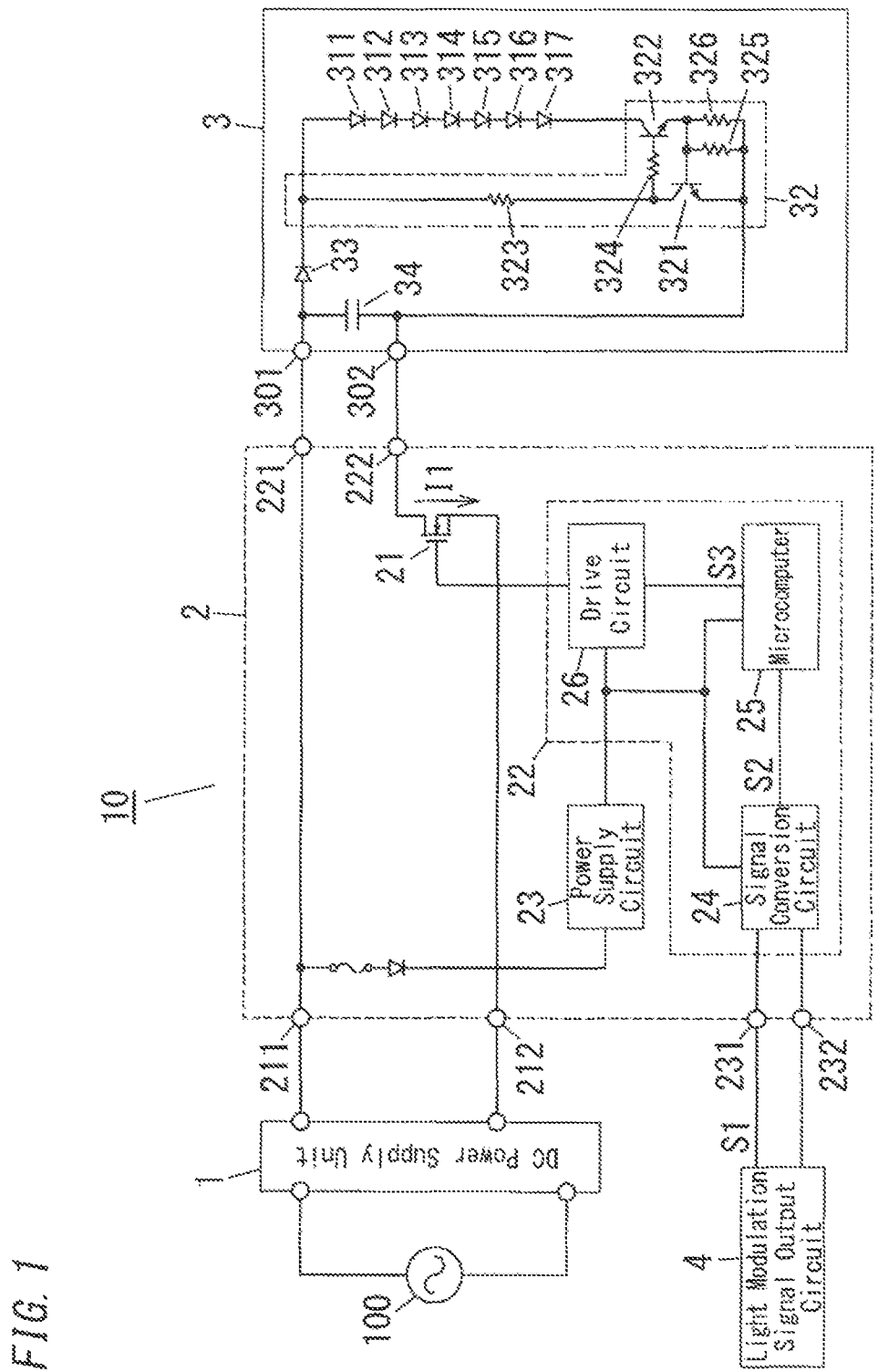
FIG. 1 is a circuit diagram of a lighting system according to an embodiment.

A lighting system 10 of the present embodiment includes a DC power supply unit 1 (DC power supply), a light modulation controller 2, a light source unit 3, and a light modulation signal output circuit 4, as shown in FIG. 1.

The DC power supply unit 1 is a typical switching power supply. The DC power supply unit 1 is configured to convert an AC voltage (effective value thereof is AC 100 [V] to AC 242 [V], for example) that is inputted from an AC power supply 100 such as a commercial AC power supply, to a constant DC voltage and output the DC voltage. The DC power supply unit 1 is configured to output a DC voltage having a voltage value (DC 24 [V], for example) capable of causing the light source unit 3 to emit light.

The light source unit 3 includes seven light-emitting diodes 311 to 317 that are semiconductor light-emitting elements, a constant current circuit 32, a diode 33 for backflow prevention, and a capacitor 34 for preventing oscillation in the constant current circuit 32. The constant current circuit 32 includes NPN-type transistors 321 and 322 and resistors 323 to 326. The constant current circuit 32 is configured to control the current that flows through the light-emitting diodes 311 to 317 so as to be constant. The semiconductor light-emitting elements are not limited to light-emitting diodes, and may be electro luminescence (EL) elements such as organic electro luminescence elements, excluding the light-emitting diodes.

Also, the light source unit 3 includes a pair of connection terminals 301 and 302. An anode of the diode 33 and one end of the capacitor 34 are electrically connected to the connection terminal 301 on a positive electrode side. A collector of the transistor 321 is electrically connected to a cathode of the diode 33 via the resistor 323.

An emitter of the transistor 321 is electrically connected to the connection terminal 302 on a negative electrode side and the other end of the capacitor 34. The collector of the transistor 321 is electrically connected to a base of the transistor 322 via the resistor 324. An emitter of the transistor 322 is electrically connected to a base of the transistor 321.

A parallel circuit of resistors 325 and 326 are electrically connected between the emitter of the transistor 322 and the emitter of the transistor 321. The seven light-emitting diodes 311 to 317 are electrically connected in series between the cathode of the diode 33 and a collector of the transistor 322 such that the direction of current flowing therethrough is the same as that in the diode 33.

Here, the capacitor 34 that is electrically connected between the pair of connection terminals 301 and 302 prevents the constant current circuit 32 from entering an oscillating state due to inductance of a wire 81 (refer to FIG. 2) that electrically connects the light modulation controller 2 and the light source unit 3. Therefore, in the case where the inductance of the wire 81 is small, the capacitor 34 need not be provided.

The light modulation controller 2 includes a MOSFET (Metal Oxide Semiconductor Field Effect Transistor) 21 (switching element), a control circuit 22, and a power supply circuit 23. The control circuit 22 includes a signal conversion circuit 24, a microcomputer 25, and a drive circuit 26, and is configured to control on and off of the MOSFET 21.

A gate of the MOSFET 21 is electrically connected to an output terminal of the drive circuit 26. Also, a drain of the MOSFET 21 is electrically connected to a later-described connection terminal 222, and a source of the MOSFET 21 is electrically connected to a later-described connection terminal 212. The switching element is not limited to the aforementioned MOSFET, and may be a bipolar transistor such as an IGBT (Insulated Gate Bipolar Transistor).

A light modulation signal S1 is inputted to the signal conversion circuit 24 from the light modulation signal output circuit 4 via later-described connection terminals 231 and 232. The light modulation signal S1 that is outputted from the light modulation signal output circuit 4 is a PWM signal whose duty ratio changes corresponding to the light modulation level of the light source unit 3, for example. The signal conversion circuit 24 is configured to convert the light modulation signal S1 to a voltage signal S2 having a voltage value (0 [V] to 10 [V], for example) depending on the duty ratio (that is, light modulation level) by smoothing the light modulation signal S1 that is inputted from the light modulation signal output circuit 4, for example.

The light modulation signal S1 that is inputted from the light modulation signal output circuit 4 to the signal conversion circuit 24 is not limited to the PWM signal, and may be a voltage signal whose voltage value changes depending on the light modulation level. In this case, the signal conversion circuit 24 may adjust the variation range of the voltage value of the light modulation signal S1, and output a signal subjected to the adjustment to the microcomputer 25.

The microcomputer 25 is configured to execute a control operation on the MOSFET 21 by executing a program stored in a ROM (Read Only Memory) with a processor such as a CPU (Central Processing Unit). The microcomputer 25 is configured to generate a PWM signal S3 whose duty ratio changes depending on the voltage value of the voltage signal S2 that is inputted from the signal conversion circuit 24, and output the PWM signal S3 to the drive circuit 26. The program may be stored in the ROM in advance, provided by a recording medium such as a memory card in which the program is stored, or provided via an electric communication line.

The output terminal of the drive circuit 26 is electrically connected to the gate of the MOSFET 21. The drive circuit 26 is configured to switch the MOSFET 21 depending on the signal level of the PWM signal S3 that is inputted from the microcomputer 25. In other words, the drive circuit 26 is configured to cause the MOSFET 21 to be an on state when the signal level of the PWM signal S3 is at a high level, and cause the MOSFET 21 to be an off state when the signal level of the PWM signal S3 is at a low level. A circuit configuration of the drive circuit 26 will be described later.

The power supply circuit 23 is configured to convert a voltage value (DC 24 [V], for example) of a DC voltage that is inputted from the DC power supply unit 1 to a predetermined voltage value (DC 12 [V], for example), and supply a voltage subjected to the conversion to the signal conversion circuit 24, the microcomputer 25, and the drive circuit 26.

The light modulation controller 2 includes a pair of connection terminals 211 and 212. The connection terminal 211 is electrically connected to an output terminal of the DC power supply unit 1 on a positive electrode side. The connection terminal 212 is electrically connected to an output terminal of the DC power supply unit 1 on a negative electrode side. Also, the light modulation controller 2 includes a connection terminal 221 on a positive electrode side and a connection terminal 222 on a negative electrode side. The connection terminal 221 is electrically connected to the connection terminal 301 of the light source unit 3. The connection terminal 222 is electrically connected to the connection terminal 302 of the light source unit 3.

Furthermore, the light modulation controller 2 includes a pair of connection terminals 231 and 232. The pair of connection terminals 231 and 232 is connected to output terminals of the light modulation signal output circuit 4. The connection terminal 211 and the connection terminal 221 are electrically connected via internal wiring.

Figure 2:
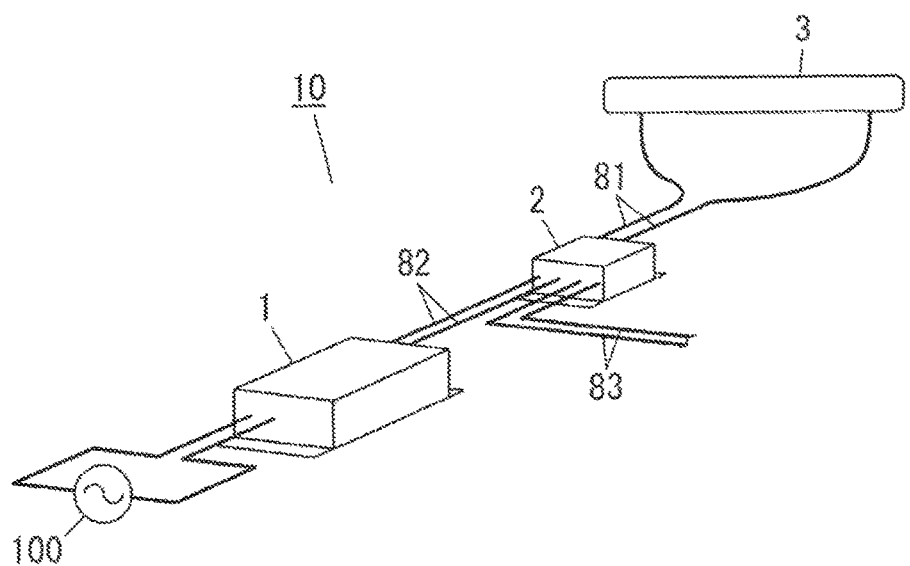
FIG. 2 is a schematic configuration diagram of the lighting system according to the embodiment.

FIG. 2 is a schematic configuration diagram of the lighting system 10 of the present embodiment. The light modulation controller 2 is electrically connected between the DC power supply unit 1 and the light source unit 3. Wires 81 from the light source unit 3 are electrically connected to the respective connection terminals 221 and 222 of the light modulation controller 2. Wires 82 from the DC power supply unit 1 are electrically connected to the respective connection terminals 211 and 212 of the light modulation controller 2. Wires 83 from the light modulation signal output circuit 4 are electrically connected to the respective connection terminals 231 and 232 of the light modulation controller 2.

Next, an operation when the light modulation controller 2 performs light-modulation control on the light source unit 3 will be described.

When a light modulation signal S1 constituted by a PWM signal having a duty ratio that corresponds to a light modulation level is inputted from the light modulation signal output circuit 4 to the light modulation controller 2, the signal conversion circuit 24 converts the light modulation signal S1 to a voltage signal S2 having a voltage value that corresponds to the duty ratio thereof, and outputs the voltage signal S2 to the microcomputer 25.

The microcomputer 25, upon receiving the voltage signal S2 from the signal conversion circuit 24, generates a PWM signal S3 having a duty ratio that corresponds to a voltage value of the voltage signal S2, and outputs the generated PWM signal S3 to the drive circuit 26.

The drive circuit 26, upon receiving the PWM signal S3 from the microcomputer 25, switches the MOSFET 21 on and off according to the signal level of the PWM signal S3. In other words, the drive circuit 26 causes the MOSFET 21 to be in an on state during a period in which the signal level of the PWM signal S3 is at a high level, and causes the MOSFET 21 to be in an off state during a period in which the signal level of the PWM signal S3 is at a low level.

When the drive circuit 26 causes the MOSFET 21 to be in the on state, a DC voltage is applied to the light source unit 3 from the DC power supply unit 1 via the light modulation controller 2, and the light-emitting diodes 311 to 317 emit light. On the other hand, when the drive circuit 26 causes the MOSFET 21 to be in the off state, a current does not flow through the light source unit 3, and the light-emitting diodes 311 to 317 do not emit light. Accordingly, a square wave voltage is applied to the light source unit 3 from the light modulation controller 2, and the light source unit 3 intermittently emits light.

In a state in which a DC voltage is applied to the light source unit 3, a current flowing through the light-emitting diodes 311 to 317 is controlled by the constant current circuit 32 so as to be constant. The light source unit 3 intermittently emits light as a result of the square wave voltage being applied to the light source unit 3 from the light modulation controller 2, and thus the light-modulation control is performed on the light source unit 3.

Also, the ratio between the period in which the light-emitting diodes 311 to 317 emit light and the period in which the light-emitting diodes 311 to 317 do not emit light changes according to the duty ratio of the PWM signal S3 that is outputted from the microcomputer 25, and as a result, the light modulation level of the light source unit 3 is controlled.

Figure 3:
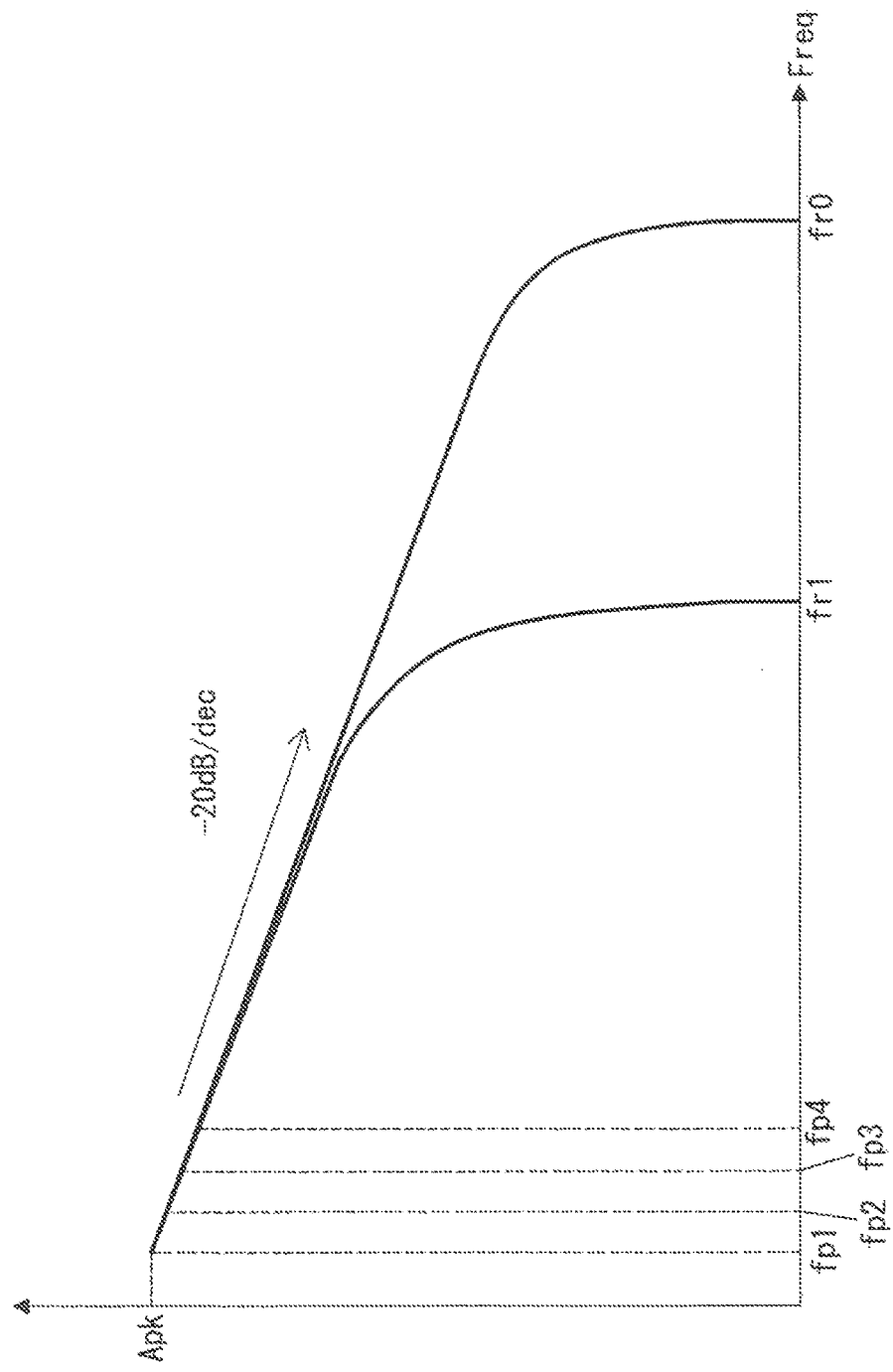
FIG. 3 is a graph illustrating a relationship between a switching frequency of a switching element and an optical frequency of a semiconductor light-emitting element in the lighting system according to the embodiment.

FIG. 3 is a graph illustrating a relationship between the switching frequency (PWM frequency) Freq of the MOSFET 21 and the optical frequency Apk of the light-emitting diodes 311 to 317 in the case where the duty ratio of the PWM signal S3 is 50%. Here, the optical frequency refers to the frequency in a cycle of emitting light, not emitting light, and emitting light in the light-emitting diode. The switching frequency Freq is preferably 100 [Hz] to 10 [kHz]. In the case where the switching frequency Freq is less than 100 [Hz], flickering is sensed by the human eyes.

Assuming that the switching frequency Freq of the MOSFET 21 is fp1, the current that is supplied to the light-emitting diodes 311 to 317 via the MOSFET 21 includes, in addition to a fundamental wave component (current component corresponding to the fundamental frequency fp1), harmonic components (current components corresponding to harmonic frequencies fp2, fp3, fp4, . . . ) having frequencies that are odd number multiples of that of the fundamental wave component. Therefore, the light that is emitted from the light-emitting diodes 311 to 317 includes optical components corresponding to the harmonic frequencies fp2, fp3, fp4, . . . , in addition to an optical component corresponding to the fundamental frequency fp1.

Here, in the case where a rising time and a falling time of the current that is supplied through the MOSFET 21, in other words, the drain current of the MOSFET 21, are both 0, an optical frequency Apk attenuates at a ratio of −20 [dB/dec] from the frequency component corresponding to the fundamental wave component fp1. That is, the frequency component of the optical frequency Apk at a frequency that is ten times the switching frequency Freq is 0.1 times the frequency component corresponding to the switching frequency Freq. Therefore, in the case where the switching frequency Freq=1 [kHz] and the optical frequency Apk=0 [dB], the component value of the optical frequency Apk at a frequency of 101 [kHz] is −40 [dB].

Also, assuming that the rising time and the falling time of the drain current of the MOSFET 21 are both tr, a changing point where the optical frequency Apk takes a minimum value exists at a rising frequency fr=1/tr. For example, in the case where the rising time and the falling time tr=1 [μsec], the optical frequency Apk takes a minimum value at the rising frequency fr0=1 [MHz]. Also, in the case where the rising time and the falling time tr=10 [μsec], the optical frequency Apk takes a minimum value at the rising frequency fr1=100 [kHz].

In the case where the rising frequency fr0=1 [MHz], the rising time and the falling time of light that is emitted from the light-emitting diodes 311 to 317 are short, and the light sharply changes, and therefore the harmonic components are generated in a wide frequency range. On the other hand, in the case where the rising frequency fr1=100 [kHz], the rising time and the falling time of light that is emitted from the light-emitting diodes 311 to 317 are long, and the light slowly changes, and therefore generation of the harmonic components can be suppressed.

From the above, in order to suppress generation of the harmonic components in light that is emitted from the light-emitting diodes 311 to 317, the light needs to slowly change, and the rising time and the falling time of the drain current of the MOSFET 21 are preferably lengthened. Therefore, in the present embodiment, the rising time and the falling time of the drain current of the MOSFET 21 are set to 1 [μsec] or more.

Figure 4:
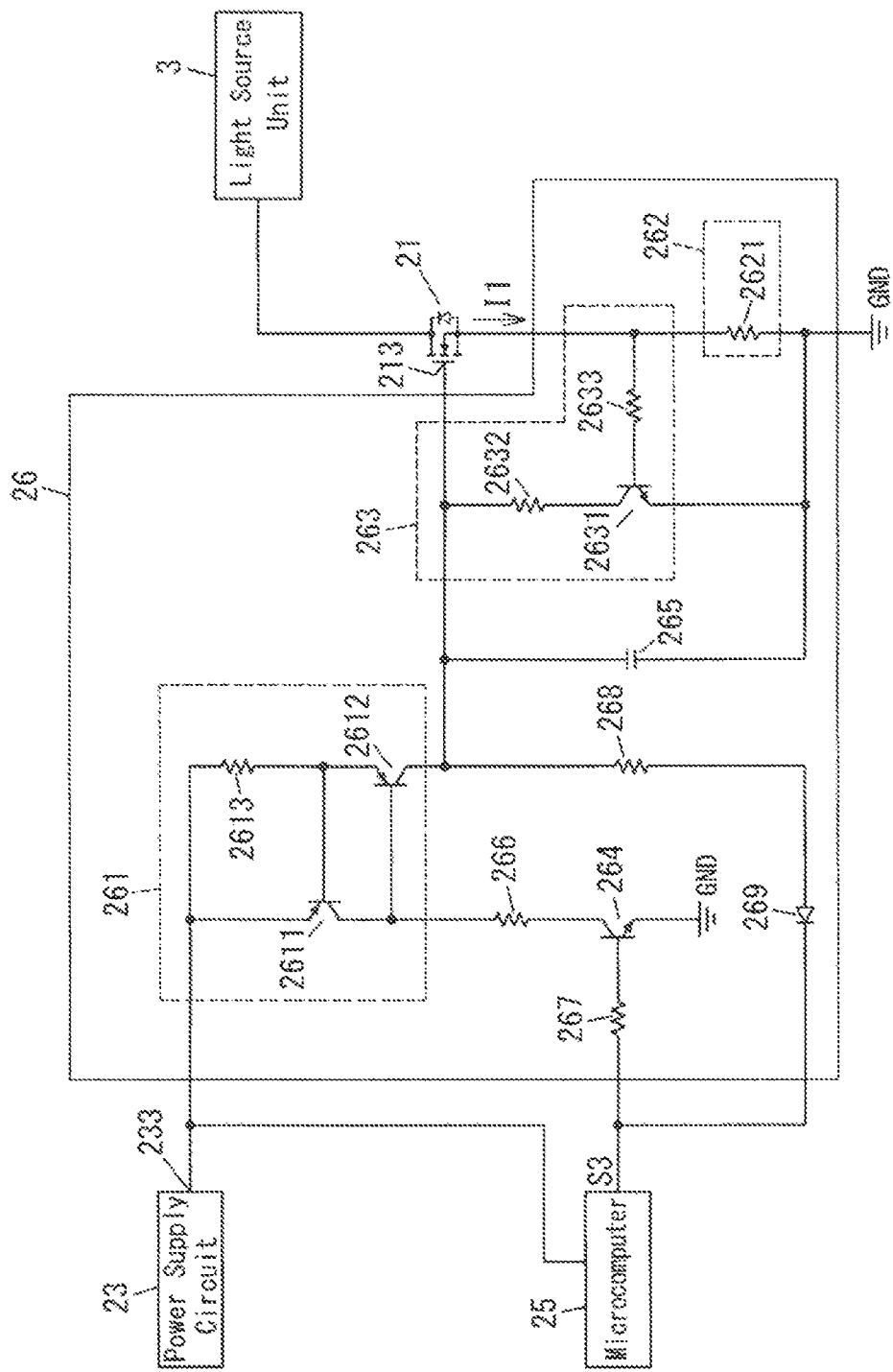
FIG. 4 is a circuit diagram illustrating main portions of a light modulation controller according to the embodiment.

In the light modulation controller 2 of the present embodiment, generation of the harmonic components in light that is emitted from the light-emitting diodes 311 to 317 is suppressed by lengthening the rising time and the falling time of the drain current of the MOSFET 21 with the drive circuit 26 shown in FIG. 4.

Also, in the case where a capacitor 34 is electrically connected between input terminals of the light source unit 3, as the lighting system 10 of the present embodiment, a pulse-like inrush current is generated at a charging start time of the capacitor 34. Therefore, the inrush current also flows between the drain and the source of the MOSFET 21.

For example, in the case where the magnitude of voltage that is supplied to the light source unit 3 is 24 [V], the current that flows through the light source unit 3 is 4.17 [A], and the static capacitance of the capacitor 34 is 1 [μF], the inrush current rises close to 30 [A]. Accordingly, a large stress is applied to the MOSFET 21.

Therefore, the light modulation controller 2 of the present embodiment is provided with a current limiter 263 configured to limit the peak value of a drain current of the MOSFET 21, as shown in FIG. 4. Hereinafter, the drive circuit 26 will be specifically described.

The drive circuit 26 includes a constant current circuit 261, a current detector 262, the current limiter 263, an NPN-type transistor 264, a capacitor 265, resistors 266 to 268, and a diode 269, as shown in FIG. 4.

The constant current circuit 261 includes PNP-type transistors 2611 and 2612 and a resistor 2613. An emitter of the transistor 2611 is electrically connected to an output terminal 233 of the power supply circuit 23 and one end of the resistor 2613. The other end of the resistor 2613 is electrically connected to a base of the transistor 2611 and an emitter of the transistor 2612.

A collector of the transistor 2611 is electrically connected to a base of the transistor 2612 and one end of the resistor 266. A collector of the transistor 2612 is electrically connected to one end of the resistor 268 and a gate of the MOSFET 21. That is, the constant current circuit 261 of the present embodiment is electrically connected between the output terminal 233 of the power supply circuit 23 and a control terminal (gate) 213 of the MOSFET 21 (switching element).

The other end of the resistor 266 is electrically connected to a collector of the transistor 264. An emitter of the transistor 264 is electrically connected to ground. A base of the transistor 264 is electrically connected to an output terminal of the microcomputer 25 via a resistor 267.

The other end of the resistor 268 is electrically connected to an anode of the diode 269. A cathode of the diode 269 is electrically connected to the output terminal of the microcomputer 25. When the signal level of the PWM signal S3 that is outputted from the microcomputer 25 is at a low level, charges accumulated in a later-described capacitor 265 are discharged in a path from the resistor 268 to the diode 269. The time constant of the discharge is set by the resistor 268.

The above-described constant current circuit 261 controls the current that flows through the resistor 2613 and the transistor 2612 so as to be constant by controlling the transistor 2612 such that the voltage across the resistor 2613 is equal to the voltage between the base and the emitter of the transistor 2611. When the transistor 264 is off, a current does not flow through the resistor 266, and thus the transistor 2612 is off and the constant current circuit 261 does not operate.

The current detector 262 includes a resistor 2621 that is electrically connected between the source of the MOSFET 21 and ground. The current detector 262 detects a current that flows between the drain and the source of the MOSFET 21, that is, a drain current I1.

The current limiter 263 includes an NPN-type transistor 2631 and resistors 2632 and 2633. The current limiter 263 is configured to limit the peak value of the drain current I1 that flows between the source and the drain of the MOSFET 21, based on a detection result by the current detector 262.

A collector of the transistor 2631 is electrically connected to the gate of the MOSFET 21 via the resistor 2632. An emitter of the transistor 2631 is electrically connected to ground. A base of the transistor 2631 is electrically connected to the source of the MOSFET 21 via the resistor 2633. The capacitor 265 is electrically connected between the gate and the source of the MOSFET 21.

Here, the aforementioned capacitor 265 is provided in order to cause a gate voltage V1 of the MOSFET 21 (voltage applied to the gate) to slowly change, and the static capacitance of the capacitor 265 is preferably set to twice or more of the parasitic capacitance of the MOSFET 21. For example, in the case where the parasitic capacitance between the gate and the source of the MOSFET 21 is 1000 [pF], the static capacitance of the capacitor 265 is set to 2000 [pF] or more. Accordingly, even in the case where the parasitic capacitance of the MOSFET 21 variates, characteristic change due to the variation of the parasitic capacitance can be suppressed.

Also, the aforementioned current limiter 263 detects a current that flows through the resistor 2621 in the current detector 262, that is, detects a voltage across the resistor 2621 due to the drain current I1 of the MOSFET 21. In the current limiter 263, when the voltage across the resistor 2621 reaches the voltage between the base and the emitter of the transistor 2631 (approximately 0.6 [V]), the transistor 2631 is turned on, the charges in the capacitor 265 are discharged via the resistor 2632. Accordingly, rising of the gate voltage V1 of the MOSFET 21 can be suppressed, and the peak value of the drain current I1 of the MOSFET 21 can be limited.

Figure 5:
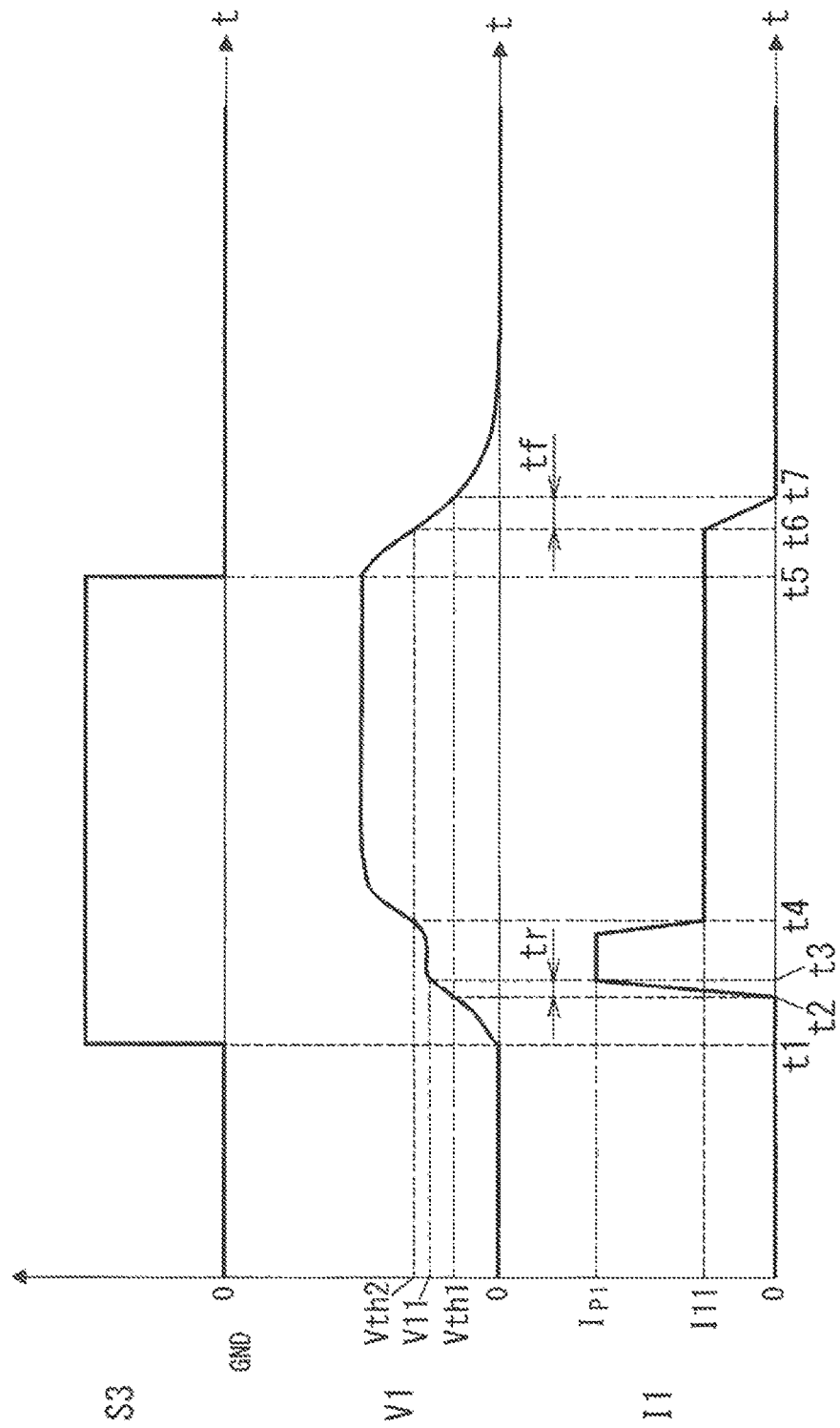
FIG. 5 is a waveform diagram for describing an operation of the light modulation controller according to the embodiment.

Next, an operation of the light modulation controller 2 in which the drive circuit 26 in FIG. 4 is used will be specifically described with reference to FIG. 5.

When the signal level of the PWM signal S3 that is inputted from the microcomputer 25 becomes a high level at time t1, the transistor 264 is turned on. When the transistor 264 is turned on, the transistor 2612 is turned on, and a current flows in a path that passes from the power supply circuit 23 to ground through the resistor 2613, the transistor 2612, and the capacitor 265. As a result, the voltage across the capacitor 265, that is, the gate voltage V1 of the MOSFET 21, rises.

The emitter current of the transistor 2612 is controlled so as to be constant by the transistor 2611 and the resistor 2613. That is, the base current of the transistor 2612 is controlled such that the voltage across the resistor 2613 is equal to a voltage Vbe between the base and the emitter of the transistor 2611. As a result, the emitter current Ie of the transistor 2612 satisfies the following relationship: Ie=Vbe/R1. If hfe (current amplification factor) of the transistor 2612 is 100 or more, Ic can be regarded as being equal to Ie. R1 is a resistance value of the resistor 2613, and Ic is a collector current of the transistor 2612.

Here, the charging speed of the capacitor 265 satisfies the following relationship: C1/Ic=C1×R1/Vbe, where C1 is the static capacitance of the capacitor 265. Assuming that C1=0.01 [µF], R1=220 [Ω], and Vbe=0.6 [V], the charging speed of the capacitor 265 is approximately 3.7 [µsec/V]. In this case, it takes approximately 19 [µsec] for the gate voltage to rise to 5 [V].

When the gate voltage V1 of the MOSFET 21 reaches a first voltage (threshold voltage) Vth1 at time t2, the MOSFET 21 is turned on, and the drain current I1 flows between the drain and the source of the MOSFET 21. The drain current I1 increases as the gate voltage V1 rises.

When the drain current I1 of the MOSFET 21 reaches a limiting value Ip1 of the current limiter 263 at time t3, the transistor 2631 is turned on, and the gate voltage V1 of the MOSFET 21 is limited to V11. As a result, the drain current I1 of the MOSFET 21 is also limited to the limiting value Ip1. Thereafter, when the drain current I1 of the MOSFET 21 decreases below the limiting value Ip1, the gate voltage V1 again rises.

When the gate voltage V1 of the MOSFET 21 reaches a second voltage Vth2 at which the on-resistance between the drain and the source becomes sufficiently small at time t4, the drain current I1 of the MOSFET 21 (current value I11) is controlled by the constant current circuit 32 of the light source unit 3 so as to be constant.

When the signal level of the PWM signal S3 becomes a low level at time t5, the transistor 264 is turned off, and the constant current circuit 261 is stopped. When the constant current circuit 261 is stopped, a current flows in a path that passes from the capacitor 265 through the resistor 268, the diode 269, and the microcomputer 25 due to the charges accumulated in the capacitor 265, and accordingly the gate voltage V1 of the MOSFET 21 decreases.

Here, the time constant when the capacitor 265 is discharged is R2×C1, where R2 is the resistance value of the resistor 268.

When the gate voltage V1 of the MOSFET 21 decreases below the second voltage Vth2 at time t6, the on-resistance between the drain and the source increases, and the drain current I1 decreases as well. When the gate voltage V1 of the MOSFET 21 decreases below the first voltage Vth1 at time t7, the MOSFET 21 is turned off, and the drain current I1 becomes zero. Thereafter, operations from time t1 to time t7 are repeated.

In the present embodiment, the peak value of the drain current I1 is limited by the current limiter 263, and therefore the stress applied to the MOSFET 21 can be reduced. Also, as a result of limiting the peak value of the drain current I1, a MOSFET 21 (switching element) having a small current capacity can be used, and therefore, cost can be reduced.

Furthermore, as in the present embodiment, as a result of lengthening the rising time tr (=t3–t2) and the falling time tf (=t7–t6) of the drain current I1 with the constant current circuit 261, the drain current I1 can be slowly changed. As a result, light that is emitted from the light-emitting diodes 311 to 317 can be slowly changed, and generation of the harmonic components in the light that is emitted from the light-emitting diodes 311 to 317 can be suppressed. Here, in the present embodiment, a voltage controller is configured by the constant current circuit 261.

Also, in the present embodiment, the MOSFET 21 is operated in an active region when the drain current I1 rises and falls, and as a result the drain current I1 is changed linearly and continuously. Also, the switching frequency of the MOSFET 21 is preferably limited to 10 [kHz] or less, and accordingly the drain current I1 can be caused to slowly rise and fall.

Incidentally, in the present embodiment, the lower limit value of the rising time tr and the falling time tf of the drain current I1 of the MOSFET 21 is set to 1 [µsec], and the upper limit value is set as follows.

Figure 6:
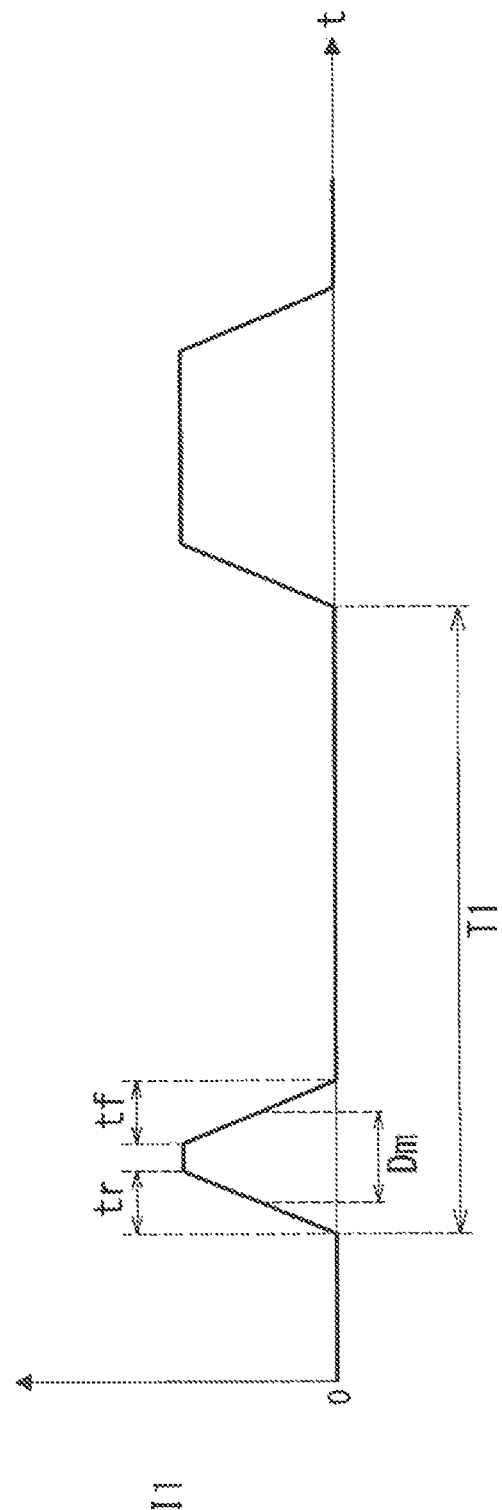
FIG. 6 is a waveform diagram of a current that flows through the switching element of the light modulation controller according to the embodiment.

FIG. 6 is a waveform diagram of the drain current I1 of the MOSFET 21. The upper limit value of the rising time tr and the falling time tf of the drain current I1 of the MOSFET 21 is obtained as T1×Dm, where T1 is the period of the PWM signal S3 that is outputted from the microcomputer 25 and Dm is the duty ratio at the lower limit of the light-modulation.

For example, in the case where the period T1=1 [msec] and the duty ratio Dm=0.5, tr and tf are respectively in the following ranges: 1 [µsec] ≤tr≤500 [µsec] and 1 [µsec] ≤tf≤500 [µsec]. It is preferable that the period T1 is set in a range from 100 [µsec] to 2 [msec], and the duty ratio Dm is set in a range from 0.01 to 0.8.

Next, a light modulation controller 2 according to Modification 1 of the present embodiment will be described.

Figure 7:
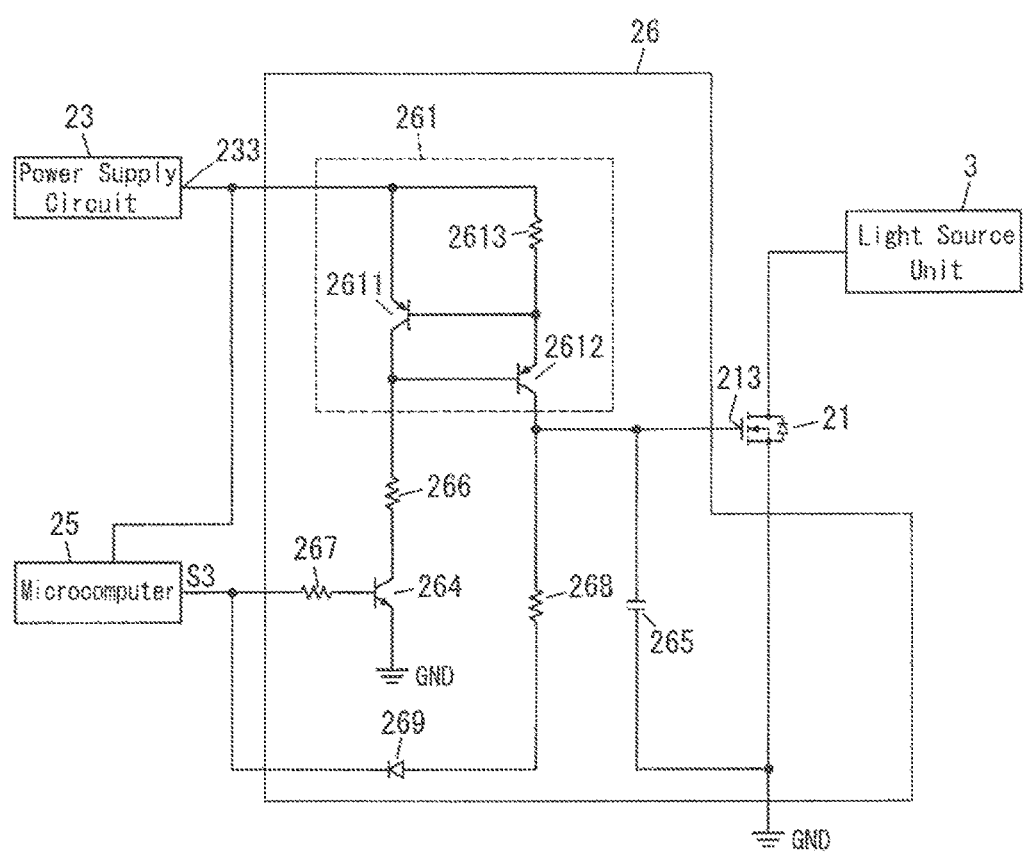
FIG. 7 is a circuit diagram illustrating main portions of a light modulation controller according to Modification 1 of the embodiment.

Although the current limiter 263 that limits the inrush current caused due to the capacitor 34 is provided in the drive circuit 26 in FIG. 4, the current limiter 263 may not be provided, as shown in FIG. 7, in the case where the inrush current is small, or the current capacity of the MOSFET 21 is large, for example. In the drive circuit 26 in FIG. 7, constituent elements other than the current detector 262 and the current limiter 263 are similar to those in the drive circuit 26 in FIG. 4, and therefore description thereof will be omitted.

Figure 8:
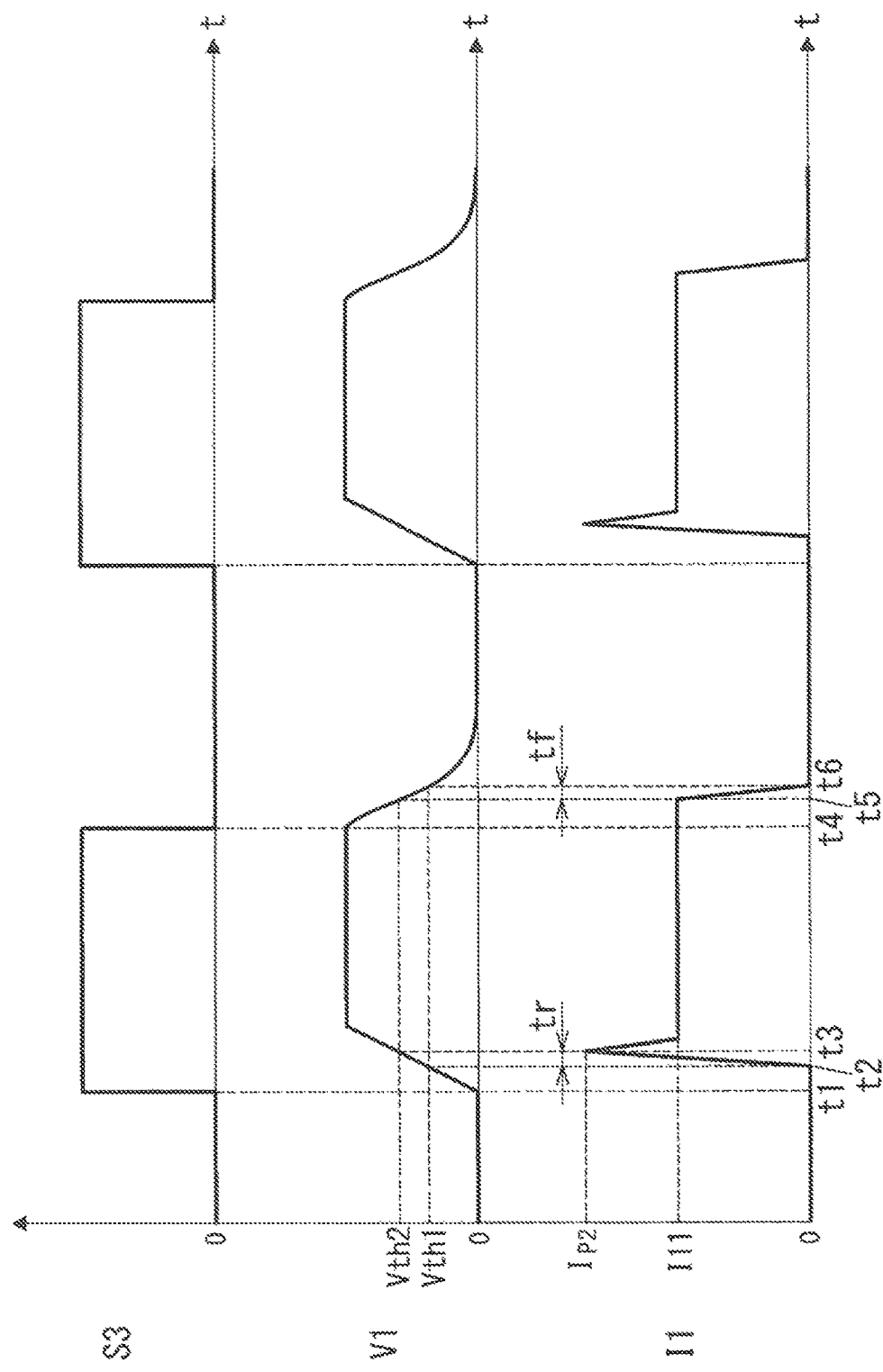
FIG. 8 is a waveform diagram for describing an operation of the light modulation controller according to Modification 1 of the embodiment.

Next, an operation of the light modulation controller 2 using the drive circuit 26 in FIG. 7 will be specifically described with reference to FIG. 8.

When the signal level of the PWM signal S3 that is inputted from the microcomputer 25 becomes a high level at time t1, the transistor 264 is turned on. When the transistor 264 is turned on, the transistor 2612 is turned on, and a current flows through a path that passes from the power supply circuit 23 to ground through the resistor 2613, the transistor 2612, and the capacitor 265. Accordingly, the voltage across the capacitor 265, that is, the gate voltage V1 of the MOSFET 21, rises.

The emitter current of the transistor 2612 is controlled by the transistor 2611 and the resistor 2613 so as to be constant. That is, the base current of the transistor 2612 is controlled such that the voltage across the resistor 2613 is equal to the voltage Vbe between the base and the emitter of the transistor 2611. As a result, the emitter current Ie of the transistor 2612 becomes Ie=Vbe/R1. If hfe (current amplification factor) of the transistor 2612 is 100 or more, Ic can be regarded as being equal to Ie.

Here, the charging speed of the capacitor 265 is C1/Ic=C1×R1/Vbe. Assuming that C1=0.01 [μF], R1=220 [Ω], and Vbe=0.6 [V], the charging speed of the capacitor 265 is approximately 3.7 [μsec/V]. In this case, it takes approximately 19 [μsec] for the gate voltage to rise to 5 [V].

When the gate voltage V1 of the MOSFET 21 reaches the first voltage (threshold voltage) Vth1 at time t2, the MOSFET 21 is turned on, and the drain current I1 flows between the drain and the source of the MOSFET 21. The drain current I1 increases as the gate voltage V1 rises.

Here, when the MOSFET 21 is turned on and the drain current I1 is supplied to the light source unit 3, an inrush current is generated in the capacitor 34 that is electrically connected between the input terminals of the light source unit 3. In Modification 1, the gate voltage V1 of the MOSFET 21 is caused to slowly rise with the constant current circuit 261, and the peak value Ip2 of the inrush current can be limited.

At time t3, the gate voltage V1 of the MOSFET 21 reaches the second voltage Vth2 at which the on-resistance between the drain and the source of the MOSFET 21 becomes sufficiently small. Here, the drain current I1 of the MOSFET 21 is controlled by the constant current circuit 32 in the light source unit 3 so as to be constant (current value I11).

When the signal level of the PWM signal S3 becomes a low level at time t4, the transistor 264 is turned off, and the constant current circuit 261 is stopped. When the constant current circuit 261 is stopped, a current flows through a path that passes from the capacitor 265 through the resistor 268, the diode 269, and the microcomputer 25 due to the charges in the capacitor 265, and accordingly the gate voltage V1 of the MOSFET 21 decreases. Here, the time constant when the capacitor 265 is discharged is R2×C1.

When the gate voltage V1 of the MOSFET 21 decreases below the second voltage Vth2 at time t5, the on-resistance between the drain and the source increases, and the drain current I1 decreases as well. When the gate voltage V1 of the MOSFET 21 decreases below the first voltage Vth1 at time t6, the MOSFET 21 is turned off, and the drain current I1 becomes zero. Thereafter, operations from time t1 to time t6 are repeated.

In Modification 1, as a result of increasing the rising time tr (=t3−t2) and the falling time tf (=t6−t5) of the drain current I1 with the constant current circuit 261, the drain current I1 can be slowly changed. As a result, light that is emitted from the light-emitting diodes 311 to 317 can be slowly changed, and generation of the harmonic components in the light that is emitted from the light-emitting diodes 311 to 317 can be suppressed.

Also, by lengthening the rising time tr and the falling time tf of the drain current I1, the peak value Ip2 of the inrush current caused due to the capacitor 34 can be limited, and the stress applied to the MOSFET 21 can be reduced.

Figure 9:
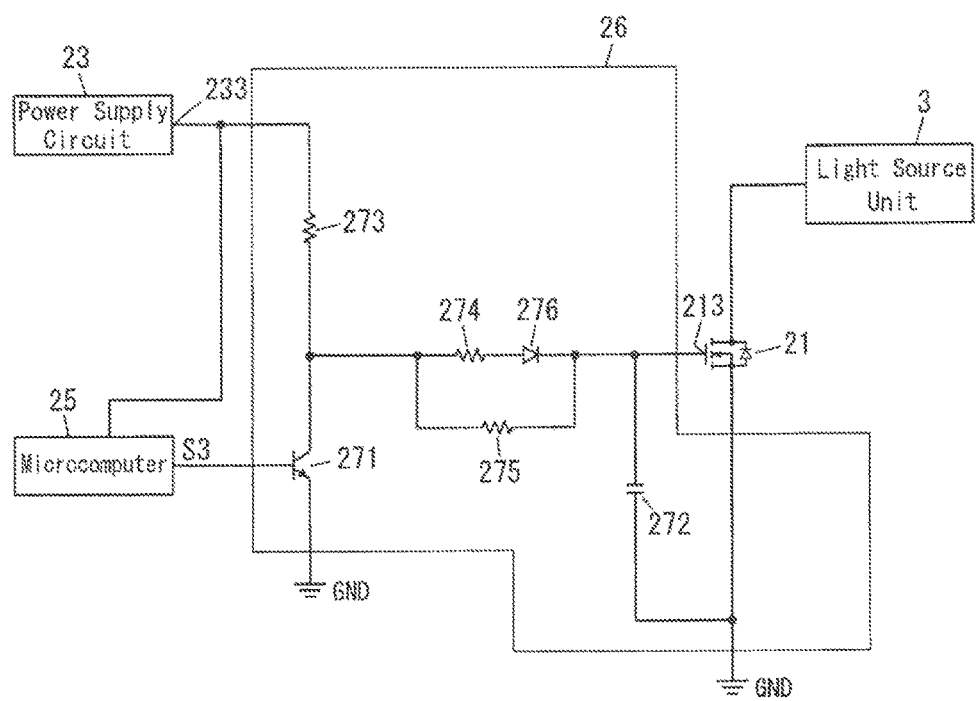
FIG. 9 is a circuit diagram illustrating main portions of a light modulation controller according to Modification 2 of the embodiment.

Next, a light modulation controller 2 according to Modification 2 of the present embodiment will be described. FIG. 9 is a circuit diagram of a drive circuit 26 of Modification 2. Although the voltage controller is configured by the constant current circuit 261 in the drive circuit 26 in FIGS. 4 and 7, the voltage controller is configured by resistors 274 and 275 in the drive circuit 26 in FIG. 9. Hereinafter, the drive circuit 26 will be specifically described.

The drive circuit 26 includes an NPN-type transistor 271, a capacitor 272, resistors 273 to 275, and a diode 276.

A base of the transistor 271 is electrically connected to the output terminal of the microcomputer 25, and on and off of the transistor 271 is controlled with the PWM signal S3 that is outputted from the microcomputer 25. A collector of the transistor 271 is electrically connected to the output terminal 233 of the power supply circuit 23 via the resistor 273. An emitter of the transistor 271 is electrically connected to ground.

A connection point between the collector of the transistor 271 and the resistor 273 is electrically connected to the gate of the MOSFET 21 (control terminal 213) via a serial circuit of the resistor 274 and the diode 276. Also, the resistor 275 is electrically connected between two ends of the serial circuit of the resistor 274 and the diode 276. Furthermore, the capacitor 272 is electrically connected between the gate and the source of the MOSFET 21.

Here, the time constant when the capacitor 272 is charged is set by the resistor 274, and the time constant when the capacitor 272 is discharging is set by the resistor 275. Also, the resistance values of the resistors 274 and 275 are preferably 1 [kΩ] or more.

Also, the capacitor 272 is provided in order to cause the gate voltage V1 of the MOSFET 21 (voltage applied to the gate) to slowly change, and the static capacitance of the capacitor 272 is preferably set to be double or more of the parasitic capacitance of the MOSFET 21. For example, in the case where the parasitic capacitance between the gate and the source of the MOSFET 21 is 1000 [pF], the static capacitance of the capacitor 272 is set to 2000 [pF] or more. Accordingly, even in the case where the parasitic capacitance of the MOSFET 21 variates, characteristic change due to the variation of the parasitic capacitance can be suppressed.

Figure 10:
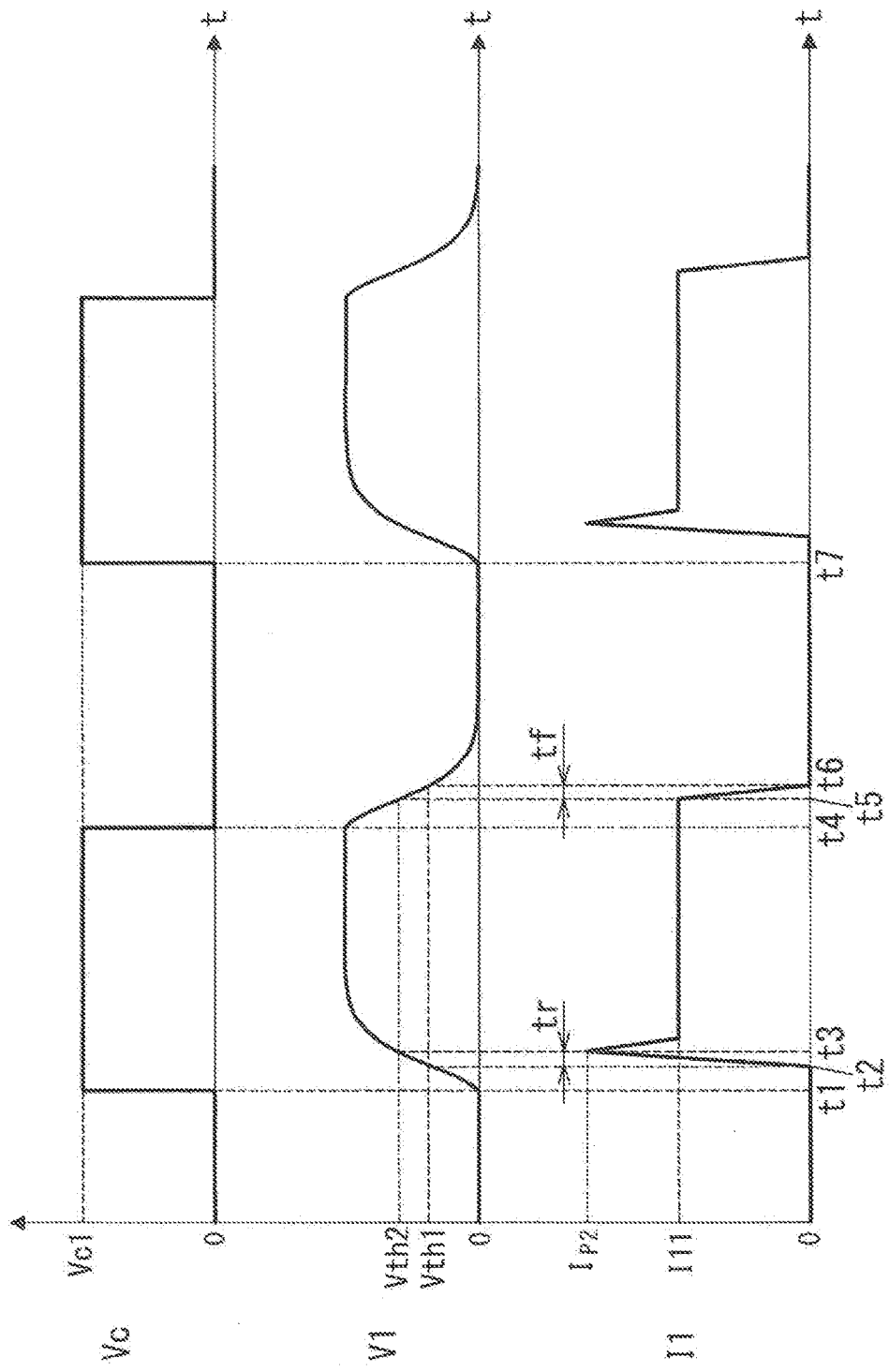
FIG. 10 is a waveform diagram for describing an operation of the light modulation controller according to Modification 2 of the embodiment.

Next, an operation of the light modulation controller 2 using the drive circuit 26 in FIG. 9 will be specifically described with reference to FIG. 10.

When the signal level of the PWM signal S3 that is outputted from the microcomputer 25 becomes a low level at time t1, the transistor 271 is turned off, and a collector voltage Vc of the transistor 271 becomes Vc1. Here, a current flows through a path that passes from the power supply circuit 23 to ground through the resistor 273, the resistor 274, the diode 276, and the capacitor 272, and a voltage across the capacitor 272, that is, the gate voltage V1 of the MOSFET 21 rises.

Here, the time constant when the capacitor 272 is charged is (R3+R4)×C2, where R3 is the resistance value of the resistor 273, R4 is the resistance value of the resistor 274, and C2 is the static capacitance of the capacitor 272.

When the gate voltage V1 of the MOSFET 21 reaches the first voltage (threshold voltage) Vth1 at time t2, the MOSFET 21 is turned on, and the drain current I1 flows between the drain and the source of the MOSFET 21. The drain current I1 increases as the gate voltage V1 rises.

Here, when the MOSFET 21 is turned on and the drain current I1 is supplied to the light source unit 3, an inrush current occurs in the capacitor 34 that is electrically connected between the input terminals of the light source unit 3. In Modification 2, the gate voltage V1 of the MOSFET 21 is caused to slowly rise by the resistor 274, and the peak value Ip2 of the inrush current can be limited.

At time t3, the gate voltage V1 of the MOSFET 21 reaches the second voltage Vth2 at which the on-resistance between the drain and the source of the MOSFET 21 becomes sufficiently small. Here, the drain current I1 of the MOSFET 21 is controlled so as to be constant (current value I11) by the constant current circuit 32 in the light source unit 3.

When the signal level of the PWM signal S3 becomes a high level at time t4, the transistor 271 is turned on, and the collector voltage Vc of the transistor 271 becomes zero. Here, a current flows due to the charges accumulated in the capacitor 272, through a path that passes from the capacitor 272 to ground through the resistor 275, and the transistor 271. Accordingly, the voltage across the capacitor 272, that is, the gate voltage V1 of the MOSFET 21, decreases.

Here, the time constant when the capacitor 272 is discharging is R5×C2, where R5 is the resistance value of the resistor 275.

When the gate voltage V1 of the MOSFET 21 decreases below the second voltage Vth2 at time t5, the on-resistance between the drain and the source increases, and the drain current I1 decreases as well. When the gate voltage V1 decreases below the first voltage Vth1 at time t6, the MOSFET 21 is turned off, and the drain current I1 becomes zero as well. Thereafter, operations from time t1 to time t6 are repeated.

In Modification 2, as a result of increasing the rising time tr (=t3−t2) and the falling time tf (=t6−t5) of the drain current I1 with the resistors 274 and 275, the drain current I1 can be slowly changed. As a result, light that is emitted from the light-emitting diodes 311 to 317 can be slowly changed, and generation of the harmonic components in the light that is emitted from the light-emitting diodes 311 to 317 can be suppressed.

Also, by lengthening the rising time tr and the falling time tf of the drain current I1, the peak value Ip2 of the inrush current caused due to the capacitor 34 can be limited, and the stress applied to the MOSFET 21 can be reduced.

Figure 11:
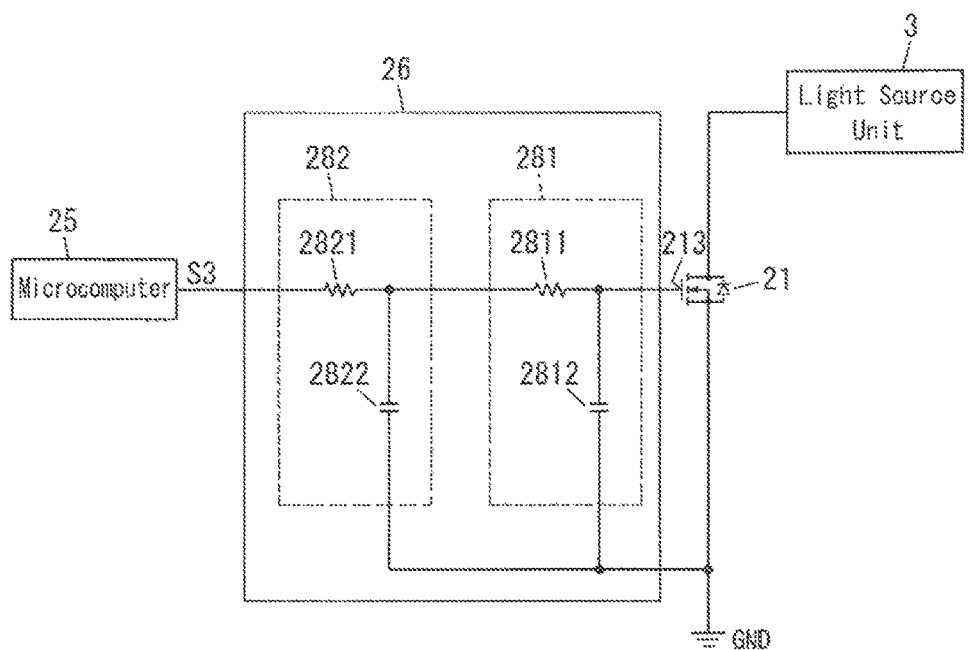
FIG. 11 is a circuit diagram illustrating main portions of a light modulation controller according to Modification 3 of the embodiment.

Next, a light modulation controller 2 according to Modification 3 of the present embodiment will be described. FIG. 11 is a circuit diagram of a drive circuit 26 of Modification 3. Although the voltage controller is configured by the constant current circuit 261 in the drive circuit 26 in FIGS. 4 and 7, the voltage controller is configured by the microcomputer 25 and filter units 281 and 282 in the drive circuit 26 in FIG. 11. Hereinafter, the drive circuit 26 will be specifically described.

The drive circuit 26 includes the two filter units 281 and 282, as shown in FIG. 11.

The filter unit 281 is a low-pass filter constituted by a resistor 2811 and a capacitor 2812. One end of the resistor 2811 is electrically connected to the gate of the MOSFET 21 (control terminal 213) and one end of the capacitor 2812. The other end of the resistor 2811 is electrically connected to one end of a resistor 2821 in the filter unit 282. Also the other end of the capacitor 2812 is electrically connected to ground.

The filter unit 282 is a low-pass filter constituted by the resistor 2821 and a capacitor 2822. One end of the resistor 2821 is electrically connected to the other end of the resistor 2811 and one end of the capacitor 2822. The other end of the resistor 2821 is electrically connected to the output terminal of the microcomputer 25. Also, the other end of the capacitor 2822 is electrically connected to ground.

Here, the time constants of the filter units 281 and 282 are set based on a minimum pulse width of the PWM signal S3 that is outputted from the microcomputer 25 and the period of the PWM signal S3.

For example, in the case where the minimum pulse width of the PWM signal S3 is 100 [µsec], the time constants of the filter units 281 and 282 are set to a value (50 [µsec] or smaller, for example) that is smaller than the period. Also, in the case where the period of the PWM signal S3 is 5 [µsec], the time constants of the filter units 281 and 282 are desirably double or more of the period of the PWM signal S3 (10 [µsec] or more). Therefore, in this case, the time constants of the filter units 281 and 282 are set in a range from 10 [µsec] to 50 [µsec].

Figure 12:
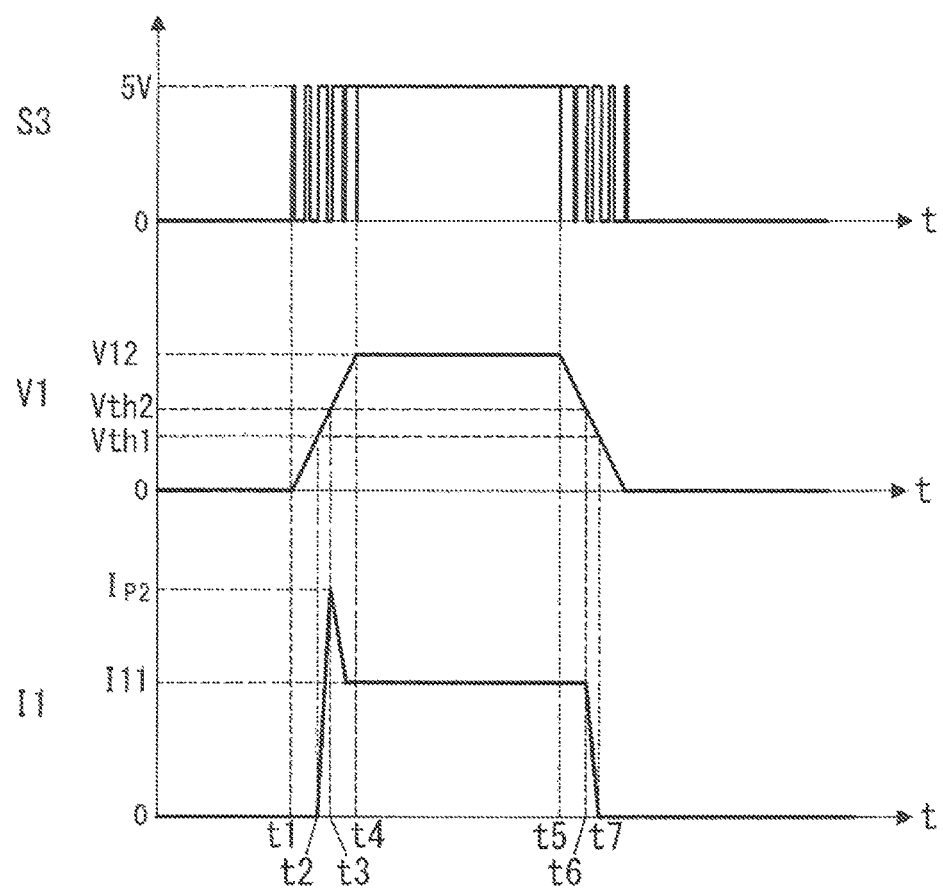
FIG. 12 is a waveform diagram for describing an operation of the light modulation controller according to Modification 3 of the embodiment.

Next, an operation of the light modulation controller 2 using the drive circuit 26 in FIG. 11 will be specifically described with reference to FIG. 12.

At time t1, the microcomputer 25 starts to output the PWM signal S3 whose pulse width increases gradually, to the drive circuit 26. The PWM signal S3 inputted to the drive circuit 26 is smoothed by the filter units 281 and 282, and a smoothed signal is applied to the gate of the MOSFET 21. Accordingly, the gate voltage V1 rises.

At time t2, the microcomputer 25 starts to output the PWM signal S3 having a larger pulse width to the drive circuit 26. The PWM signal S3 inputted to the drive circuit 26 is smoothed by the filter units 281 and 282, and a smoothed signal is applied to the gate of the MOSFET 21. Accordingly, the gate voltage V1 further rises, and when the gate voltage V1 reaches the first voltage (threshold voltage) Vth1, the MOSFET 21 is turned on, and the drain current I1 flows between the drain and the source of the MOSFET 21. The drain current I1 increases as the gate voltage V1 rises.

Here, when the MOSFET 21 is turned on, and the drain current I1 is supplied to the light source unit 3, an inrush current occurs in the capacitor 34 that is electrically connected between the input terminals of the light source unit 3. In Modification 3, the gate voltage V1 of the MOSFET 21 is caused to slowly rise by the filter units 281 and 282, and therefore the peak value Ip2 of the inrush current can be limited.

At time t3, the gate voltage V1 of the MOSFET 21 reaches the second voltage Vth2 at which the on-resistance between the drain and the source of the MOSFET 21 becomes sufficiently small. Here, the drain current I1 of the MOSFET 21 is controlled by the constant current circuit 32 in the light source unit 3 so as to be constant (current value I11).

At time t4, the microcomputer 25 starts to output the PWM signal S3 whose amplitude is fixed to a high level (DC 5 [V]) to the drive circuit 26, and accordingly, the gate voltage V1 of the MOSFET 21 is maintained to be constant (voltage value V12).

At time t5, the microcomputer 25 starts to output the PWM signal S3, whose pulse width gradually decreases, to the drive circuit 26, and accordingly, the gate voltage V1 of the MOSFET 21 gradually decreases in accordance with the pulse width.

When the gate voltage V1 of the MOSFET 21 decreases below the second voltage Vth2 at time t6, the on-resistance between the drain and the source increases, and the drain current I1 decreases as well. When the gate voltage V1 of the MOSFET 21 decreases below the first voltage Vth1 at time t7, the MOSFET 21 is turned off, and the drain current I1 becomes zero. Thereafter, operations from time t1 to time t7 are repeated.

In Modification 3, as a result of increasing the rising time tr (=t3−t2) and the falling time tf (=t7−t6) of the drain current I1 with the microcomputer 25 and the filter units 281 and 282, the drain current I1 can be slowly changed. As a result, light that is emitted from the light-emitting diodes 311 to 317 can be slowly changed, and generation of the harmonic components in the light that is emitted from the light-emitting diodes 311 to 317 can be suppressed.

Also, by lengthening the rising time tr and the falling time tf of the drain current I1, the peak value Ip2 of the inrush current caused due to the capacitor 34 can be limited, and the stress applied to the MOSFET 21 can be reduced. Furthermore, as a result of changing a control pattern of the pulse width of the PWM signal S3 that is outputted from the microcomputer 25, control accuracy when the drain current I1 rises or falls can be improved compared with the drive circuits 26 in FIGS. 7 and 9. Here, in Modification 3, a signal output unit is configured by the microcomputer 25.

Figure 13:
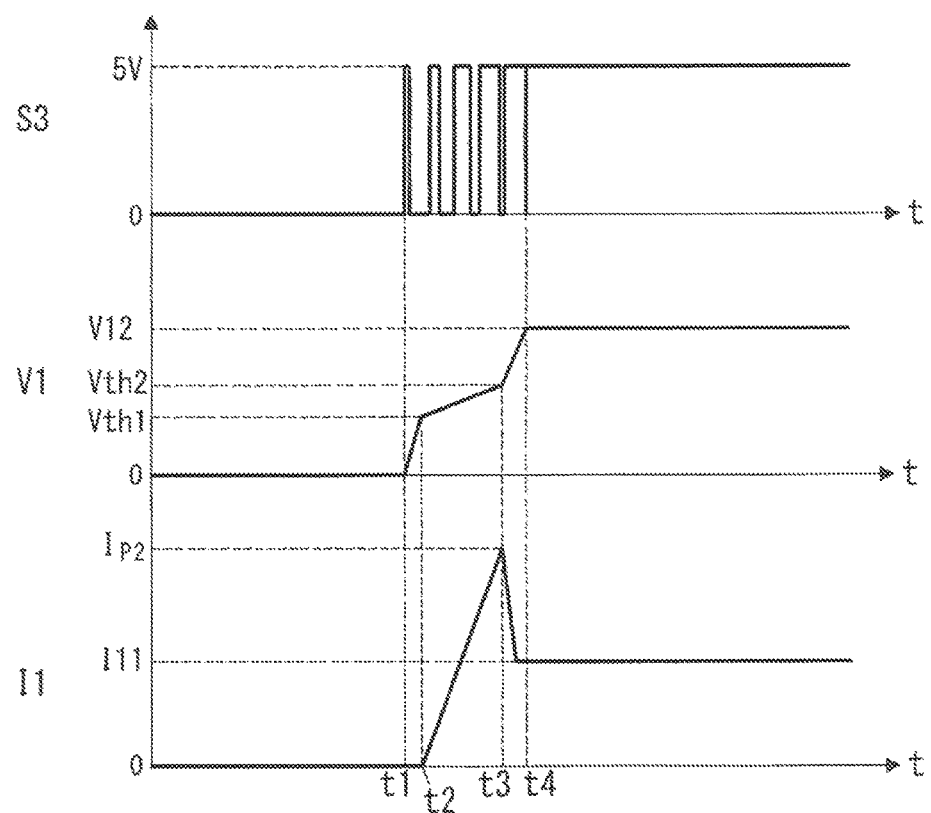
FIG. 13 is a waveform diagram for describing another operation of the light modulation controller according to Modification 3 of the embodiment.

Incidentally, the drive circuit 26 in FIG. 11 may also be operated such that the waveforms are as shown in a waveform diagram illustrated in FIG. 13. Hereinafter, specific description will be given.

The microcomputer 25 outputs the PWM signal S3 having a small pulse width to the drive circuit 26 such that a transition time (t2−t1) becomes short in a period from time t1 to time t2 during which the MOSFET 21 is not turned on. Accordingly, the gate voltage V1 of the MOSFET 21 sharply rises.

At time t2, the microcomputer 25 starts to output the PWM signal S3 having a larger pulse width to the drive circuit 26. When the gate voltage V1 of the MOSFET 21 reaches the first voltage (threshold voltage) Vth1 as a result of the larger pulse width, the MOSFET 21 is turned on. When the MOSFET 21 is turned on, the drain current I1 flows between the drain and the source. The drain current I1 increases as the gate voltage V1 rises.

Here, when the MOSFET 21 is turned on, and the drain current I1 is supplied to the light source unit 3, an inrush current occurs in the capacitor 34 that is electrically connected between the input terminals of the light source unit 3. In Modification 3, the gate voltage V1 of the MOSFET 21 is caused to slowly rise by the filter units 281 and 282, and therefore the peak value Ip2 of the inrush current can be limited.

At time t3, the gate voltage V1 of the MOSFET 21 reaches the second voltage Vth2 at which the on-resistance between the drain and the source of the MOSFET 21 becomes sufficiently small. Here, the drain current I1 of the MOSFET 21 is controlled by the constant current circuit 32 in the light source unit 3 so as to be constant (current value I11).

Thereafter, the microcomputer 25 changes the pulse width of the PWM signal S3 so as to shorten the transition time (t4−t3) in a period from time t3 to time t4 during which the gate voltage V1 increases to reach a voltage V12.

In Modification 3, as a result of changing the pulse width of the PWM signal S3 as described above, the rising time tr of the drain current I1 can be further lengthened without changing the period during which the gate voltage V1 increases to reach a constant voltage (V12). Accordingly, generation of the harmonic components in the light that is emitted from the light-emitting diodes 311 to 317 can be further suppressed.

Although, in the above-described embodiment, a case where the PWM signal S3 is outputted from the microcomputer 25 has been described, a D/A conversion with a ladder resistor circuit, or $\Delta\Sigma$ modulation may be used, for example.

Figure 14:
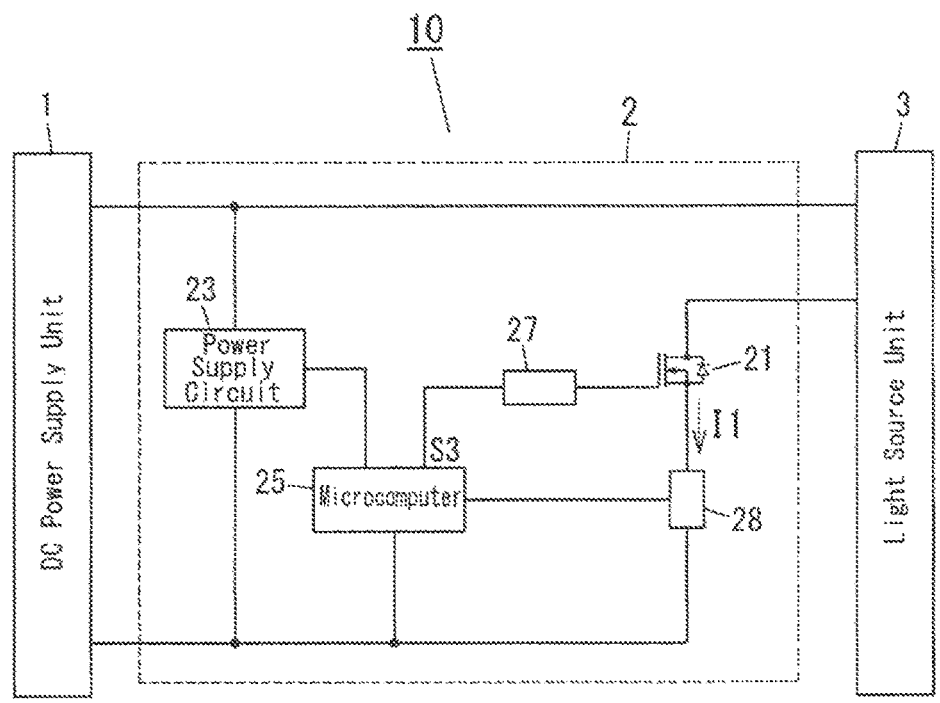
FIG. 14 is a circuit diagram of a lighting system according to Modification 4 of the embodiment.

FIG. 14 is a circuit diagram of a lighting system 10 according to Modification 4 of the present embodiment. The lighting system 10 of Modification 4 includes the DC power supply unit 1, the light modulation controller 2, and the light source unit 3. The light modulation controller 2 includes the MOSFET 21, the power supply circuit 23, the microcomputer 25, a low-pass filter 27, and a current detection circuit 28.

The power supply circuit 23 is configured to generate power for the microcomputer 25 to operate from an output of the DC power supply unit 1, and supply the generated power to the microcomputer 25. The current detection circuit 28 includes a resistor electrically connected between the source of the MOSFET 21 and an output terminal of the DC power supply unit 1 on a negative electrode side, for example. The current detection circuit 28 is configured to detect the drain current I1 of the MOSFET 21, and output the detection result to the microcomputer 25.

The microcomputer 25 is configured to generate the PWM signal S3 based on the light modulation signal that is inputted from the outside and the detection result of the current detection circuit 28, and output the PWM signal S3 to the MOSFET 21. Here, the PWM signal S3 is smoothed with the low-pass filter 27, and a smoothed signal is applied to the gate of the MOSFET 21.

Figure 15:
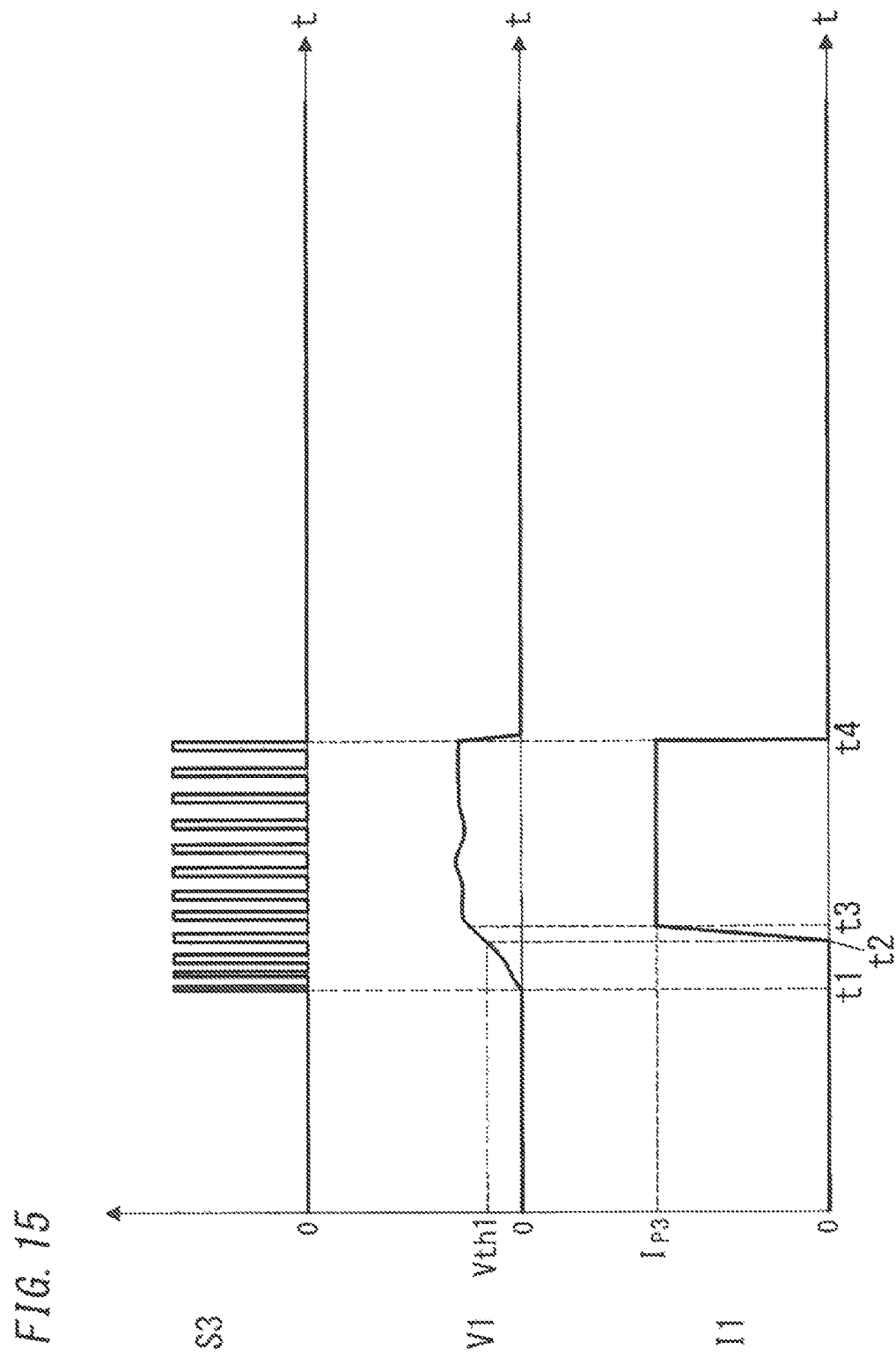
FIG. 15 is a waveform diagram for describing an operation of the lighting system according to Modification 4 of the embodiment.

Next, an operation of the lighting system 10 in FIG. 14 will be specifically described with reference to FIG. 15. Hereinafter, a case where a short circuit occurs inside the light source unit 3 will be described as an example. Also, the ROM, which is a constituent element of the microcomputer 25, stores, in advance, an upper limit value Ip3 of the drain current I1 of the MOSFET 21.

At time t1, the microcomputer 25 starts to output the PWM signal S3 whose pulse width gradually increases. The PWM signal S3 is smoothed by the low-pass filter 27, and a smoothed signal is applied to the gate of the MOSFET 21. Accordingly, the gate voltage V1 of the MOSFET 21 rises.

At time t2, the microcomputer 25 starts to output the PWM signal S3 having a larger pulse width. When the gate voltage V1 of the MOSFET 21 reaches the first voltage (threshold voltage) Vth1 as a result of the larger pulse width, the MOSFET 21 is turned on. When the MOSFET 21 is turned on, the drain current I1 flows between the drain and the source. The drain current I1 increases as the gate voltage V1 rises.

At time t3, a short circuit occurs inside the light source unit 3. When the drain current I1 of the MOSFET 21 reaches the upper limit value Ip3, the microcomputer 25 sets the pulse width of the PWM signal S3 such that the drain current I1 is constant (current value Ip3). Accordingly, rising of the gate voltage V1 of the MOSFET 21 can be suppressed.

The microcomputer 25, upon determining that a state in which the drain current I1 is equal to Ip3 continues in a given period (t4–t3) based on the detection result of the current detection circuit 28, stops outputting of the PWM signal S3 and sets the gate voltage V1 of the MOSFET 21 to zero. Accordingly, the MOSFET 21 is turned off, and the drain current I1 of the MOSFET 21 becomes zero.

When only the current limiter 263 is provided as in the above-described drive circuit 26 in FIG. 4, for example, although the peak value of the drain current I1 of the MOSFET 21 can be limited, a state in which the loss in the MOSFET 21 is large is maintained. In contrast, according to the light modulation controller 2 in FIG. 14, when a short circuit occurs inside the light source unit 3, the light modulation controller 2 can be safely stopped.

Also, as a result of detecting the drain current I1 with the current detection circuit 28, the first voltage Vth1 at which the MOSFET 21 is turned on and the second voltage Vth2 at which the on-resistance between the drain and the source of the MOSFET 21 becomes sufficiently small can also be detected. Accordingly, variations in the first voltage Vth1 and the second voltage Vth2 due to individual differences of the MOSFETs 21 can be corrected, and control accuracy when the drain current I1 rises or falls can be improved.

Figure 16:
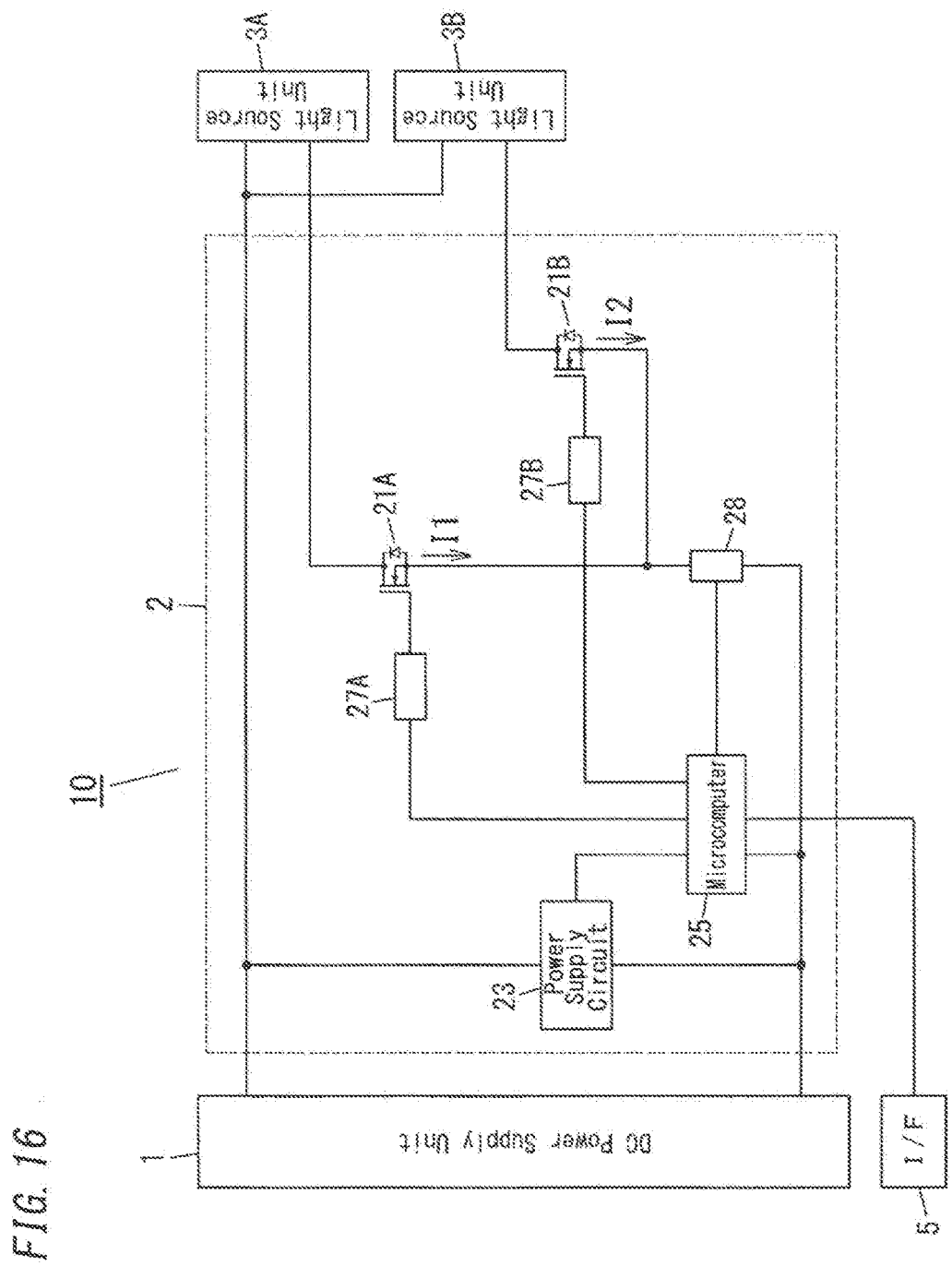
FIG. 16 is a circuit diagram of a lighting system according to Modification 5 of the embodiment.

FIG. 16 is a circuit diagram of a lighting system 10 according to Modification 5 of the present embodiment. In the above FIG. 14, a case where the number of light source units 3 is one was described, however, the lighting system 10 may be configured to control first and second light source units 3A and 3B, as shown in FIG. 16.

The lighting system 10 of Modification 5 includes the DC power supply unit 1, the light modulation controller 2, the first and second light source units 3A and 3B, and an interface circuit 5. The interface circuit 5 is configured to relay between an externally provided light modulator and the microcomputer 25 of the light modulation controller 2, and output a light modulation signal received from the light modulator to the microcomputer 25.

The light modulation controller 2 includes first and second MOSFETs 21A and 21B, the power supply circuit 23, the microcomputer 25, first and second low-pass filters 27A and 27B, and the current detection circuit 28. The number of light source units 3 is not limited to two, and may be three or more. In this case, the number of MOSFETs 21 and low-pass filters 27 needs to be increased so as to match the number of light source units 3.

The power supply circuit 23 is configured to generate power for the microcomputer 25 to operate from the output of the DC power supply unit 1, and supply the generated power to the microcomputer 25.

The first MOSFET 21A is electrically connected to the first light source unit 3A, and is also electrically connected to the microcomputer 25 via the first low-pass filter 27A. The second MOSFET 21B is electrically connected to the second light source unit 3B, and is also electrically connected to the microcomputer 25 via the second low-pass filter 27B.

The current detection circuit 28 includes, for example, a first resistor that is electrically connected between a source of the first MOSFET 21A and the output terminal of the DC power supply unit 1 on a negative electrode side, and a second resistor that is electrically connected between a source of the second MOSFET 21B and the output terminal. The current detection circuit 28 is configured to detect a drain current I1 of the first MOSFET 21A with the first resistor, detect a drain current I2 of the second MOSFET 21B with the second resistor, and output the detection results to the microcomputer 25. The current detection circuit 28 may be provided for each of the light source units 3.

Figure 17:
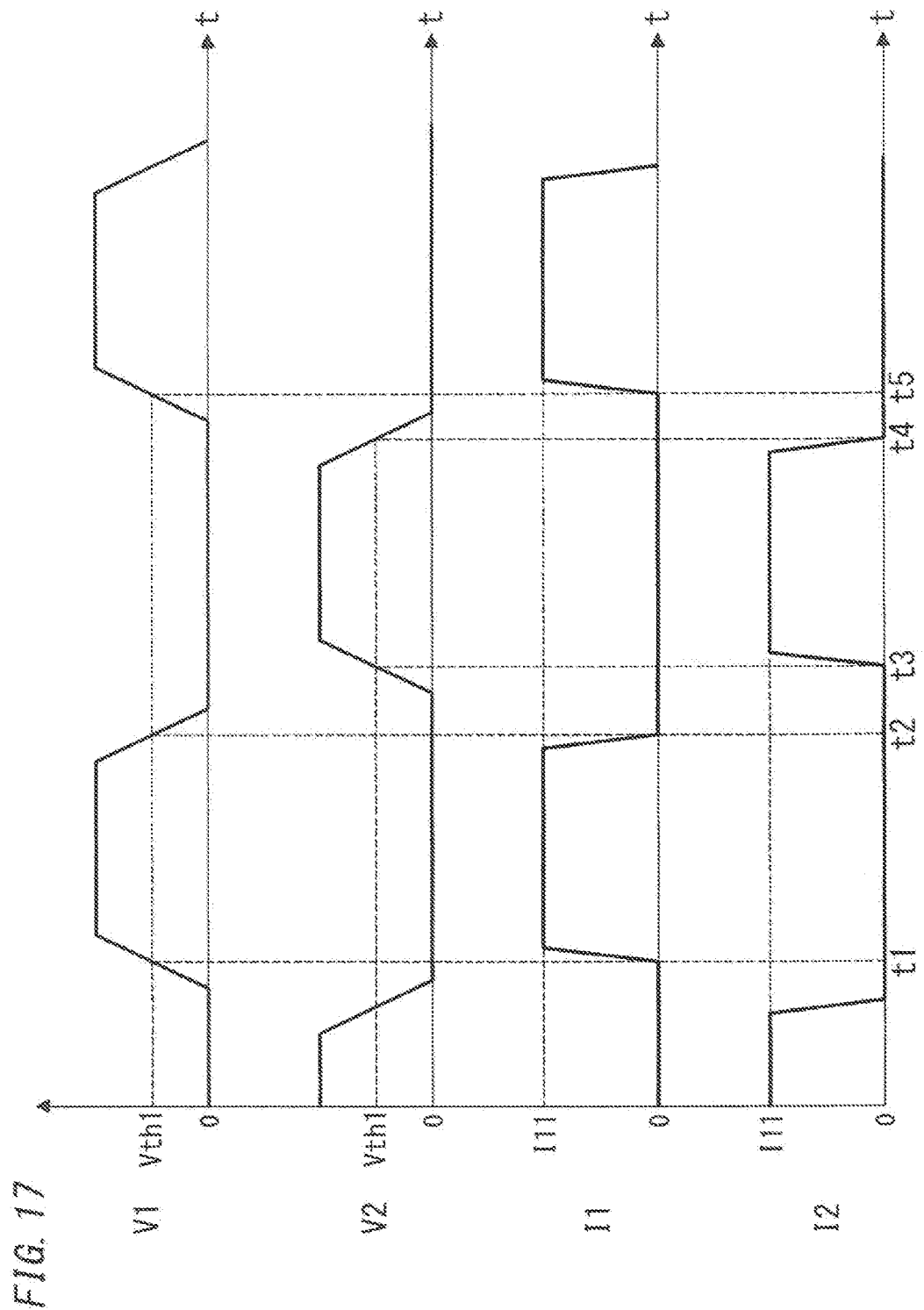
FIG. 17 is a waveform diagram for describing an operation of the lighting system according to Modification 5 of the embodiment.

Next, an operation of the lighting system 10 in FIG. 16 will be specifically described with reference to FIG. 17.

At time t1, when a gate voltage V1 of the first MOSFET 21A reaches the first voltage (threshold voltage) Vth1, the first MOSFET 21A is turned on, and the drain current I1 flows. Thereafter, when the gate voltage V1 of the first MOSFET 21A reaches the second voltage Vth2 at which an on-resistance between the drain and the source becomes sufficiently small, the drain current I1 is controlled by the constant current circuit 32 in the first light source unit 3A so as to be constant (current value Il1). At this time, a gate voltage V2 of the second MOSFET 21B is 0 [V], and the second MOSFET 21B is off.

At time t2, the gate voltage V1 of the first MOSFET 21A decreases below the first voltage Vth1, the first MOSFET 21A is turned off, and the drain current I1 becomes zero. At this time, the gate voltage V2 of the second MOSFET 21B is 0 [V], and the second MOSFET 21B remains off.

At time t3, the gate voltage V2 of the second MOSFET 21B reaches the first voltage Vth1, the second MOSFET 21B is turned on, and the drain current I2 flows. Thereafter, when the gate voltage V2 of the second MOSFET 21B reaches the second voltage Vth2 at which an on-resistance between the drain and the source becomes sufficiently small, the drain current I2 is controlled by the constant current circuit 32 in the second light source unit 3B so as to be constant (current value Il1). At this time, the gate voltage V1 of the first MOSFET 21A is 0 [V], and the first MOSFET 21A is off.

At time t4, the gate voltage V2 of the second MOSFET 21B decreases below the first voltage Vth1, the second MOSFET 21B is turned off, and the drain current I2 becomes zero. At this time, the gate voltage V1 of the first MOSFET 21A is 0 [V], and the first MOSFET 21A remains to be off. Thereafter, operations in the period from time t1 to time t4 are repeated.

Here, in the case where the light color is different between the first light source unit 3A and the second light source unit 3B, the color temperature of mixed-color light resulting from mixing lights from the first and second light source units 3A and 3B can be changed by changing the ratio between the lighting period (t2–t1) of the first light source unit 3A and the lighting period (t4–t3) of the second light source unit 3B.

Incidentally, although, in Modification 5, the first and second light source units 3A and 3B are controlled so as to be alternatingly lit, the first and second light source units 3A and 3B may be controlled so as to be lit at the same time. Note that, in this case, the sum of the drain current I1 that flows when the first light source unit 3A is lit and the drain current I2 that flows when the second light source unit 3B is lit needs to be within an allowable range of the DC power supply unit 1.

A preferable configuration is such that a value of the output voltage of the DC power supply unit 1 is inputted to the microcomputer 25 so that a voltage drop in the output voltage from the DC power supply unit 1 can be detected, as a method for determining whether or not the sum of the drain currents I1 and I2 is in the allowable range of the DC power supply unit 1.

Here, although, in the above-described embodiment, a case where the drain current I1 rises and falls linearly has been described as an example, the drain current I1 may not rise and fall linearly. In this case also, as a result of the drain current I1 slowly rising and falling, generation of the harmonic components in the light that is emitted from the light-emitting diodes 311 to 317 can be suppressed.

Also, although, in the above-described embodiment, both the rising time tr and the falling time tf of the drain current I1 are lengthened, it is sufficient that at least one of the rising time tr and the falling time tf is lengthened. It is preferable that the rising time tr is lengthened.

As described above, the light modulation controller 2 of the above-described embodiment includes the switching element (MOSFET 21) and the control circuit 22. The switching element is electrically connected between the DC power supply (DC power supply unit 1) and the light source unit 3. The light source unit 3 includes the semiconductor light-emitting elements (light-emitting diodes 311 to 317). The DC power supply outputs a DC voltage having a voltage value capable of causing the semiconductor light-emitting elements to emit light. The control circuit 22 controls a switching operation of the switching element. The control circuit 22 is configured to convert a DC voltage that is outputted from the DC power supply to a square wave voltage by switching the switching element according to the PWM signal S3 having a duty ratio corresponding to the light modulation level of the light source unit 3, and output the square wave voltage to the light source unit 3. The control circuit 22 includes a voltage controller (constant current circuit 261, for example). The voltage controller controls an operating voltage (gate voltage V1) for operating the switching element such that at least one of the rising time tr and the falling time tf of a current (drain current ID flowing through the switching element is 1 microsecond or more.

According to the above configuration, the current I1 flowing through the switching element slowly changes in at least one of a period in which the current I1 rises and a period in which the current I1 falls, and accordingly the light emitted from the semiconductor light-emitting elements slowly changes. As a result, generation of the harmonic components in the light that is emitted from the semiconductor light-emitting elements due to switching operation of the switching element can be suppressed.

Also, as in the light modulation controller 2 of the above-described embodiment, the voltage controller preferably controls the operating voltage such that the rising time tr is 1 microsecond or more.

According to the above configuration, a current slowly changes when the current flowing through the switching element rises, and accordingly the light emitted from the semiconductor light-emitting elements slowly changes. As a result, generation of the harmonic components in the light that is emitted from the semiconductor light-emitting elements due to switching operation of the switching element can be suppressed. Note that this configuration is not an essential configuration of the light modulation controller 2, and the voltage controller may be configured to control the operating voltage such that the falling time tf is 1 microsecond or more, for example.

Also, as in the light modulation controller 2 of the above-described embodiment, the voltage controller preferably controls the operating voltage such that at least one of the rising time tr and the falling time tf is T1×Dm or less. T1 is the period of the PWM signal S3, and Dm is the duty ratio at a lower limit of the light-modulation.

According to the above configuration, the current I1 flowing through the switching element slowly changes in at least one of a period in which the current I1 rises and a period in which the current I1 falls, and accordingly the light emitted from the semiconductor light-emitting elements slowly changes. As a result, generation of the harmonic components in the light that is emitted from the semiconductor light-emitting elements due to the switching operation of the switching element can be suppressed. Note that this configuration is not an essential configuration of the light modulation controller 2. For example, as long as the current I1 slowly changes in at least one of a period in which the current I1 rises and a period in which the current I1 falls, the operating voltage may be controlled such that both the rising time tr and the falling time tf exceed T1×Dm.

Also, as in the light modulation controller 2 of the above-described embodiment, the switching element is preferably constituted by the transistor (MOSFET 21). In this case, the voltage controller preferably continuously changes the current flowing through the transistor by controlling the operating voltage such that the transistor operates in an active region in the at least one of the rising time tr and the falling time tf.

According to the above configuration, in at least one of a period in which a current flowing through the switching element rises and a period in which the current falls, the current slowly changes and accordingly the light emitted from the semiconductor light-emitting elements slowly changes. As a result, generation of the harmonic components in the light that is emitted from the semiconductor light-emitting elements due to the switching operation of the switching element can be suppressed. Note that this configuration is not an essential configuration of the light modulation controller 2, and the switching element is not limited to the transistor, and may be a thyristor, for example.

Also, as in the light modulation controller 2 of the above-described embodiment, the light modulation controller 2 preferably further includes the power supply circuit 23 that supplies the operating voltage. In this case, the voltage controller preferably includes the resistors 274 and 275 having a resistance of 1 kilo-ohm or more that are electrically connected between the output terminal 233 of the power supply circuit 23 and the control terminal (gate) 213 of the switching element.

According to the above configuration, as a result of increasing the time constant set by the resistors 274 and 275, the operating voltage of the switching element slowly rises, and accordingly the current flowing through the switching element slowly rises. As a result, light that is emitted from the semiconductor light-emitting elements slowly changes, and generation of the harmonic components in the light that is emitted from the semiconductor light-emitting elements due to switching operation of the switching element can be suppressed. Note that this configuration is not an essential configuration of the light modulation controller 2, and the voltage controller may include the constant current circuit 261, for example.

Also, as in the light modulation controller 2 of the above-described embodiment, the light modulation controller 2 preferably further includes the power supply circuit 23 that supplies the operating voltage. In this case, the voltage controller preferably includes the constant current circuit 261 that is electrically connected between the output terminal 233 of the power supply circuit 23 and the control terminal (gate) 213 of the switching element.

According to the above configuration, the operating voltage of the switching element is caused to rise slowly with the constant current circuit 261, and therefore the current flowing through the switching element slowly rises. As a result, light that is emitted from the semiconductor light-emitting elements slowly changes, and generation of the harmonic components in the light that is emitted from the semiconductor light-emitting elements due to the switching operation of the switching element can be suppressed. Note that this configuration is not an essential configuration of the light modulation controller 2, and the voltage controller may include the resistors 274 and 275 having a resistance of 1 kilo-ohm or more, for example.

Also, as in the light modulation controller 2 of the above-described embodiment, the voltage controller preferably includes the signal output unit (microcomputer 25) and the filter units 281 and 282. The signal output unit outputs the PWM signal having a pulse width corresponding to the magnitude of the operating voltage, and the filter units 281 and 282 smooth the PWM signal and output a smoothed signal to the control terminal (gate) 213 of the switching element.

According to the above configuration, as a result of adjusting the pulse width of the PWM signal that is outputted from the signal output unit, the operating voltage of the switching element can be caused to rise slowly, and accordingly the current flowing through the switching element can be caused to rise slowly. As a result, light that is emitted from the semiconductor light-emitting elements slowly changes, and generation of the harmonic components in the light that is emitted from the semiconductor light-emitting elements due to the switching operation of the switching element can be suppressed. Note that this configuration is not an essential configuration of the light modulation controller 2, and the voltage controller may include the constant current circuit 261, for example.

Also, as in the light modulation controller 2 of the above-described embodiment, the control circuit 22 is preferably configured to limit the switching frequency of the switching element to 10 kilohertz or below.

According to the above configuration, as a result of limiting the switching frequency of the switching element to 10 kilohertz or below, the current that flows through the switching element slowly rises and falls. As a result, light that is emitted from the semiconductor light-emitting elements slowly changes, and generation of the harmonic components in the light that is emitted from the semiconductor light-emitting elements due to the switching operation of the switching element can be suppressed. Note that this configuration is not an essential configuration of the light modulation controller 2. For example, as long as the current that flows through the switching element slowly rises and falls, the switching frequency may exceed 10 kilohertz.

Also, as in the light modulation controller 2 of the above-described embodiment, the light modulation controller 2 preferably further includes the current detector 262 and the current limiter 263. The current detector 262 detects a current flowing through the switching element. The current limiter 263 limits the peak value of a current that flows through the switching element based on the detection result of the current detector 262.

According to the above configuration, as a result of limiting the peak value of a current that flows through the switching element by the current limiter 263, excessive current flowing through the switching element can be suppressed. As a result, a switching element having a small current capacity can be used. Note that this configuration is not an essential configuration of the light modulation controller 2, and the current detector 262 and the current limiter 263 may be omitted.

The lighting system 10 of the above-described embodiment includes the light source unit 3 and the light modulation controller 2. The light source unit 3 includes the semiconductor light-emitting elements (light-emitting diodes 311 to 317). The light modulation controller 2 performs light modulation control on the light source unit 3.

According to the above configuration, the lighting system 10 in which generation of the harmonic components in light that is emitted from the semiconductor light-emitting elements due to the switching operation of the switching element is suppressed can be realized.

Incidentally, the lighting system 10 described in the above-described embodiment can also be applied to an equipment instrument including a light source unit for lighting, in addition to a lighting fixture for space lighting. Such the examples of the equipment instrument include a refrigerated showcase that includes a light source unit for lighting of products, a vending machine that includes a light source unit for lighting of products or product samples, and the like.

Figure 18:
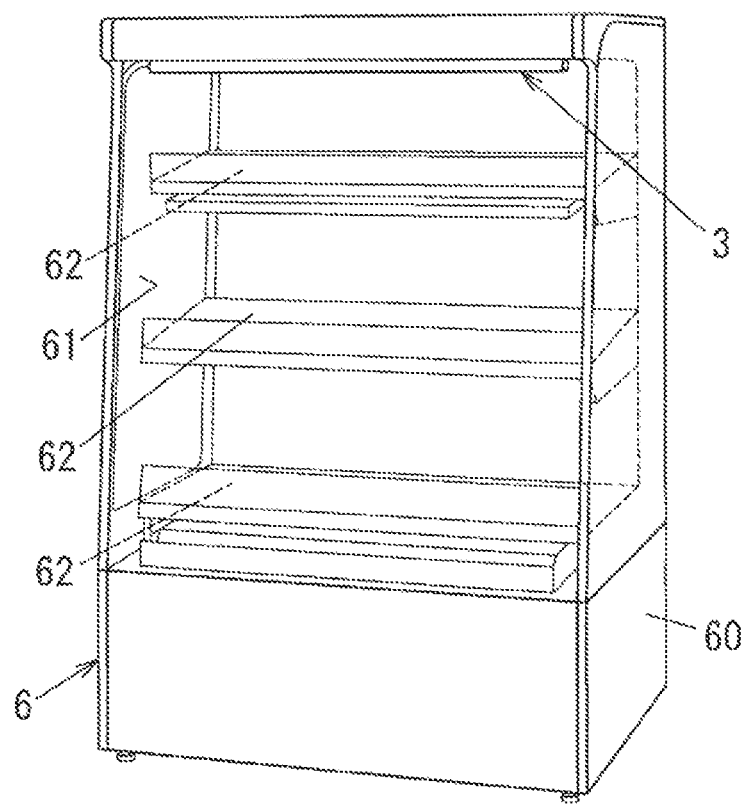
FIG. 18 is an external perspective view of a refrigerated showcase serving as an equipment instrument according to the embodiment.

FIG. 18 is an external perspective view of a refrigerated showcase 6 serving as an equipment instrument of the present embodiment. The refrigerated showcase 6 is installed in a retail store such as a convenience store, for example, and is used for displaying and selling products while cooling or heating the products. A body 60 (equipment instrument body) of the refrigerated showcase 6 includes a display chamber 61 whose front face is open. Two or more (three, in the present embodiment) display racks 62 for displaying products are provided in the display chamber 61.

The light source unit 3 is installed in a ceiling portion of the display chamber 61 in the body 60, and the DC power supply unit 1 and the light modulation controller 2 are attached to the body 60. The light source unit 3 is subjected to light modulation control by the light modulation controller 2, and the products that are displayed on the display racks 62 are lit with light emitted from the light source unit 3.

Figure 19:
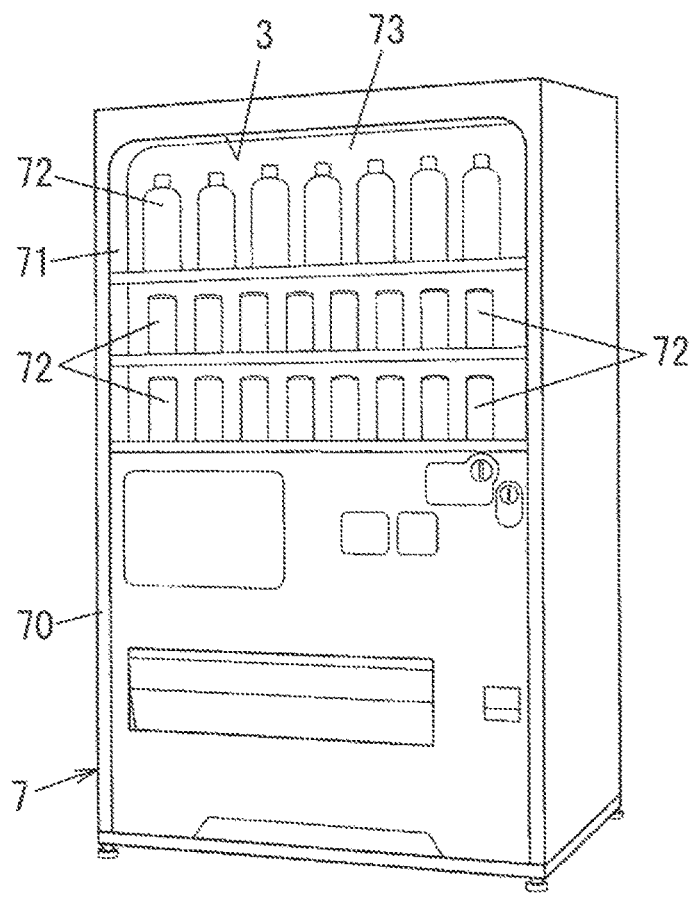
FIG. 19 is an external perspective view of a vending machine serving as an equipment instrument according to the embodiment.

FIG. 19 is an external perspective view of a vending machine 7 serving as an equipment instrument of the present embodiment. A display compartment 71 for displaying product samples 72 is provided inside a body 70 (equipment instrument body) of the vending machine 7, and the inside of the display compartment 71 can be seen through a transparent window portion 73 provided in a front face of the body 70.

Inside the body 70, the light source unit 3 is arranged on an upper side of the display compartment 71, for example. Also, the DC power supply unit 1 and the light modulation controller 2 are arranged inside the body 70. The light source unit 3 is subjected to light modulation control by the light modulation controller 2, and the product samples 72 that are placed in the display compartment 71 are lit by light emitted from the light source unit 3.

As a result of the recent rise in energy-saving awareness, there is a need to suppress power consumption of the light source unit 3 in order to suppress power consumption of equipment instruments in seasons such as summer and winter in which demand for electric power increases and in a time slot such as daytime, during which natural light exists. The equipment instruments of the present embodiment include the light modulation controller 2, and as a result of the light modulation controller 2 performing light modulation control for light emission on the light source unit 3, power consumption of the light source unit 3 can be suppressed while lighting objects such as a product or a product sample.

As described above, the equipment instruments (refrigerated showcase 6, vending machine 7) of the present embodiment include the light source unit 3, the light modulation controller 2, and the equipment instrument body (body 60 or 70). The light source unit 3 includes the semiconductor light-emitting elements (light-emitting diodes 311 to 317). The light modulation controller 2 performs light modulation control on the light source unit 3. Each equipment instrument body holds the light source unit 3 and the light modulation controller 2.

According to the above-described configuration, the equipment instrument in which generation of the harmonic components in light that is emitted from the semiconductor light-emitting elements due to the switching operation of the switching element is suppressed can be realized.

The invention claimed is:

1. A light modulation controller, comprising:
a switching element configured to be electrically connected between a light source unit and a DC power supply that is configured to output a DC voltage having a voltage value capable of causing a semiconductor light-emitting element included in the light source unit to emit light; and
a control circuit configured to control a switching operation of the switching element,
the control circuit being configured to convert the DC voltage that is outputted from the DC power supply to a square wave voltage by switching the switching element according to a PWM signal having a duty ratio that corresponds to a light modulation level of the light source unit, and cause the square wave voltage to be outputted to the light source unit,
the control circuit including a voltage controller configured to control an operating voltage, derived in relation to the PWM signal, for operating the switching element such that at least one of a rising time and a falling time of a current that flows through the switching element is 1 microsecond or more,
the voltage controller being configured to control the operating voltage such that the at least one of the rising time and the falling time is T1×Dm or less, where T1 represents a period of the PWM signal and Dm represents the duty ratio at a lower limit of the light modulation level of the light source unit.

2. The light modulation controller according to claim 1, wherein the voltage controller is configured to control the operating voltage such that the rising time is 1 microsecond or more.

3. The light modulation controller according to claim 1, wherein the switching element includes a transistor, and the voltage controller is configured to control the operating voltage such that the transistor operates in an active region for the at least one of the rising time and the falling time so as to cause the current that flows through the transistor to change continuously.

4. The light modulation controller according to claim 3, further comprising a power supply circuit configured to supply the operating voltage,
wherein the voltage controller includes resistors of 1 kilo-ohm or more that are electrically connected between an output terminal of the power supply circuit and a control terminal of the switching element.

5. The light modulation controller according to claim 3, further comprising a power supply circuit configured to supply the operating voltage,
wherein the voltage controller includes a constant current circuit that is electrically connected between an output terminal of the power supply circuit and a control terminal of the switching element.

6. The light modulation controller according to claim 3, wherein the voltage controller includes a signal output unit configured to output the PWM signal having a pulse width that corresponds to a magnitude of the operating voltage, and filter units configured to smooth the PWM signal, and output a smoothed signal to a control terminal of the switching element.

7. The light modulation controller according to claim 1, wherein the control circuit is configured to limit a switching frequency of the switching element to 10 kilohertz or less.

8. The light modulation controller according to claim 1, further comprising:
a current detector configured to detect the current that flows through the switching element; and
a current limiter configured to limit a peak value of the current that flows through the switching element based on a detection result of the current detector.

9. An equipment instrument comprising:
the light modulation controller according to claim 1;
the light source unit; and
an equipment instrument body that holds the light source unit and the light modulation controller.

10. The light modulation controller according to claim 2, wherein the switching element includes a transistor,
the voltage controller is configured to control the operating voltage such that the transistor operates in an active region for the at least one of the rising time and the falling time so as to cause the current that flows through the transistor to change continuously.

11. The light modulation controller according to claim 10, further comprising a power supply circuit configured to supply the operating voltage,
wherein the voltage controller includes resistors of 1 kilo-ohm or more that are electrically connected between an output terminal of the power supply circuit and a control terminal of the switching element.

12. The light modulation controller according to claim 10, further comprising a power supply circuit configured to supply the operating voltage,
wherein the voltage controller includes a constant current circuit that is electrically connected between an output terminal of the power supply circuit and a control terminal of the switching element.

13. The light modulation controller according to claim 10, wherein the voltage controller includes a signal output unit configured to output the PWM signal having a pulse width that corresponds to a magnitude of the operating voltage, and filter units configured to smooth the PWM signal, and output a smoothed signal to a control terminal of the switching element.

14. A lighting system comprising:
a light modulation controller; and
a light source unit,
wherein the light modulation controller, comprising:
a switching element configured to be electrically connected between the light source unit and a DC power supply that is configured to output a DC voltage having a voltage value capable of causing a semiconductor light-emitting element included in the light source unit to emit light; and a control circuit configured to control a switching operation of the switching element, the control circuit being configured to convert the DC voltage that is outputted from the DC power supply to a square wave voltage by switching the switching element according to a PWM signal having a duty ratio that corresponds to a light modulation level of the light source unit, and cause the square wave voltage to be outputted to the light source unit, the control circuit including a voltage controller configured to control an operating voltage, derived in relation to the PWM signal, for operating the switching element such that at least one of a rising time and a falling time of a current that flows through the switching element is 1 microsecond or more, the voltage controller being configured to control the operating voltage such that the at least one of the rising time and the falling time is T1×Dm or less, where T1 represents a period of the PWM signal and Dm represents the duty ratio at a lower limit of the light modulation level of the light source unit.

* * * * *